(12) United States Patent
Kim et al.

(10) Patent No.: US 12,600,646 B2
(45) Date of Patent: *Apr. 14, 2026

(54) WATER PURIFYING APPARATUS AND REFRIGERATOR INCLUDING THE SAME

(71) Applicant: LG Electronics Inc., Seoul (KR)

(72) Inventors: Youngjae Kim, Seoul (KR); Changhwan Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 224 days.

This patent is subject to a terminal disclaimer.

(21) Appl. No.: 18/380,827

(22) Filed: Oct. 17, 2023

(65) Prior Publication Data

US 2024/0043285 A1 Feb. 8, 2024

Related U.S. Application Data

(63) Continuation of application No. 17/346,727, filed on Jun. 14, 2021, now Pat. No. 11,827,532.

(30) Foreign Application Priority Data

Apr. 13, 2021 (KR) ........................ 10-2021-0047919

(51) Int. Cl.
*C02F 1/00* (2023.01)
*B01D 29/15* (2006.01)
*B01D 35/02* (2006.01)
*B01D 35/147* (2006.01)
(Continued)

(52) U.S. Cl.
CPC .............. *C02F 1/003* (2013.01); *B01D 29/15* (2013.01); *B01D 35/02* (2013.01); *B01D 35/147* (2013.01);
(Continued)

(58) Field of Classification Search
CPC ................ B01D 35/147; B01D 35/306; B01D 2201/302; B01D 2201/303;
(Continued)

(56) References Cited

U.S. PATENT DOCUMENTS 8,132,675 B2   3/2012   Calcaterra et al.
8,177,972 B2   5/2012   Grummert et al.
(Continued)

FOREIGN PATENT DOCUMENTS

CA    3181050     3/2013
CN    107215905   9/2017
(Continued)

OTHER PUBLICATIONS

Extended European Search Report in European Appln. No. 202114055264.2, dated Aug. 8, 2022, 8 pages.
(Continued)

*Primary Examiner* — Benjamin M Kurtz
(74) *Attorney, Agent, or Firm* — Fish & Richardson P.C.

(57) ABSTRACT

Provided are a water purifying apparatus and a refrigerator including the same. The water purifying apparatus includes a filter configured to purify incoming water and discharge the purified water, a head in which the filter is detachably coupled and a water inlet portion and a water outlet portion are formed, and a shaft provided inside the head and rotatably mounted between the water inlet portion and the water outlet portion, the shaft being provided with a bypass flow path directly connecting the water inlet portion and the water outlet portion and a filtering flow path connected so that water flowing in through the water inlet portion is discharged to the water outlet portion via the filter.

20 Claims, 28 Drawing Sheets

(51) Int. Cl.
  *B01D 35/30* (2006.01)
  *F25D 23/12* (2006.01)
(52) U.S. Cl.
  CPC ........... *B01D 35/30* (2013.01); *F25D 23/126*
      (2013.01); *B01D 2201/303* (2013.01); *B01D*
      *2201/304* (2013.01); *B01D 2201/4038*
      (2013.01); *C02F 2307/12* (2013.01); *F25D*
      *2323/121* (2013.01)
(58) Field of Classification Search
  CPC ......... B01D 2201/4061; C02F 2307/12; F25D
      2323/121
  USPC ........................................................ 210/235
  See application file for complete search history.

(56) References Cited

U.S. PATENT DOCUMENTS

| | | | | |
|---|---|---|---|---|
| 11,827,532 | B2 * | 11/2023 | Kim ..................... | B01D 35/306 |
| 2004/0211717 | A1 | 10/2004 | Mitchell et al. | |

| | | | |
|---|---|---|---|
| 2013/0068682 | A1 | 3/2013 | Kruckenberg et al. |
| 2017/0274304 | A1 | 9/2017 | You et al. |
| 2018/0318739 | A1 | 11/2018 | Park |
| 2022/0176280 | A1 | 6/2022 | Zou |

FOREIGN PATENT DOCUMENTS

| | | |
|---|---|---|
| EP | 0116181 | 8/1984 |
| EP | 3222337 | 9/2017 |
| JP | H11-147249 | 6/1999 |
| KR | 10-2015-0135021 | 12/2015 |

OTHER PUBLICATIONS

Office Action in Indian Appln. No. 202114055264, dated Oct. 19, 2022, 6 pages.
Office Action in Chinese Appln. No. 202210307355.X, mailed on Mar. 23, 2023, 16 pages(with English translation).

\* cited by examiner

FIG. 3

A strain according to a change in torque load

WATER PURIFYING APPARATUS AND REFRIGERATOR INCLUDING THE SAME

CROSS-REFERENCE TO RELATED APPLICATIONS

The present application is a continuation of U.S. application Ser. No. 17/346,727, filed on Jun. 14, 2021, which claims priority under 35 U.S.C. 119 and 35 U.S.C. 365 to Korean Patent Application No. 10-2021-0047919, filed on Apr. 13, 2021, which are hereby incorporated by reference in their entirety.

BACKGROUND

The present disclosure relates to a water purifying apparatus and a refrigerator including the same.

In general, a water purifying apparatus is used to purify supplied water using a filter or filtering material, and includes an apparatus that purifies water from a water pipe or tank to be fit to drink.

A representative example of the water purifying apparatus that supplies drinkable water is a water purifier. Recently, the entire or a portion of such a water purifying apparatus has been provided even in a refrigerator to be supplied with purified water through the refrigerator or make ice using the purified water.

In a refrigerator including the water purifying apparatus, a filter constituting the water purifying apparatus is required to be replaced or inspected as necessary. Accordingly, the filter is detachably installed for this purpose. The water purifying apparatus is configured to have a bypass flow path which is capable of supplying water even in a state where the filter is separated and then a user can take out water even during replacement or inspection of the filter.

Korean Patent Laid-Open Publication No. 10-2015-0135021 discloses a head for a water purifying filter having a bypass structure.

However, the head of the related art has a complicated structure so that the flow path is capable of being opened and closed by a flow path switching plunger which is supported by an elastic member at the time of attachment and detachment of the filter. Therefore, there is a problem of poor productivity and assembling workability.

In addition, external force is applied in the process of detaching the filter from the head or switching to the bypass flow path or the flow path flowing to the water purifying filter. There is a problem that an insertion part of the filter and the flow path switching plunger are damaged or deformed by the action of such an external force, thus deteriorating the flow performance of water.

SUMMARY

Embodiments provide a water purifying apparatus capable of switching to a filtering flow path or a bypass flow path according to attachment or detachment of a filter, and a refrigerator including the water purifying apparatus.

Embodiments provide a water purifying apparatus capable of preventing damage or deformation of a shaft in a process of attaching or detaching a filter by reinforcing the strength of the shaft that rotates together with the filter to convert a flow path, and a refrigerator including the water purifying apparatus.

Embodiments provide a water purifying apparatus capable of causing water to smoothly flow when the filtering flow path is switched by mounting the filter, and a refrigerator including the same.

A water purifying apparatus according to an embodiment of the present disclosure includes a filter configured to purify incoming water and discharge the purified water, a head in which the filter is detachably coupled and a water inlet portion and a water outlet portion are formed, and a shaft provided inside the head and rotatably mounted between the water inlet portion and the water outlet portion, the shaft being provided with a bypass flow path directly connecting the water inlet portion and the water outlet portion and a filtering flow path connected so that water flowing in through the water inlet portion is discharged to the water outlet portion via the filter, wherein the shaft is provided with an inner pipe communicating with the filter to form a portion of the filtering flow path and coupled to one end portion of the filter, and wherein the shaft includes a reinforcing portion projecting from an inner surface of the inner pipe and extending upward from a lower end of the inner pipe.

The reinforcing portion may extend to an upper end of the inner pipe.

A first connecting portion may be formed at one end of the filter, a second connecting portion, which is coupled to the first connecting portion when the filter is mounted, may be formed at the lower end of the inner pipe, and the reinforcing portion may extend upward from a lower end of the second connecting portion.

A pair of second connecting portions may be formed at the lower end of the inner pipe, and a pair of reinforcing portions may be formed at a position corresponding to the second connecting portion.

A pipe cutout portion may be positioned between the pair of second connecting portions, and a lower end of the reinforcing portion may be positioned below an upper end of the pipe cutout portion.

A length from the inner surface of the inner pipe to a projecting end portion of the reinforcing part may be formed to be smaller than a length from an outer surface to the inner surface of the inner pipe.

A pair of reinforcing portions may be formed to be symmetrical on the inner surface of the inner pipe, and a distance between the pair of reinforcing portions facing each other may be formed to be longer than a distance from the inner surface of the inner pipe to a protruding end portion of the reinforcing portion.

The filtering flow path may include a horizontal portion extending from a shaft entrance formed around the shaft toward a center of the shaft and a vertical portion connected to an end portion of the horizontal portion and formed inside the inner pipe, and the reinforcing portion may extend to an upper end of the vertical portion.

A pair of first connecting portions may be formed at one end of the filter, a pair of second connecting portions, which are coupled to the pair of first connecting portions when the filter is mounted, may be formed at the lower end of the inner pipe, a pair of pipe cutout portions may be formed between the pair of second connecting portions to rotate the shaft by being coupled to the pair of first connecting portions when the filter is rotated, and the reinforcing portion may be provided between the pair of pipe cutout portions.

An upper end of the reinforcing portion may extend to the same height as the upper end of the pipe cutout portion.

A pair of first connecting portions may be formed at one end of the filter, a pair of second connecting portions, which are coupled to the pair of first connecting portions when the filter is mounted, may be formed at the lower end of the inner pipe, and a plurality of reinforcing portions may be formed in each of the second connecting portions.

A plurality of reinforcing portions may be formed at positions symmetrical with respect to a central line of the inner pipe.

The inner pipe may further include an inclined portion which is inclined to connect one end of the reinforcing portion on the inner surface.

A round portion may be included at a corner of the reinforcing portion.

A refrigerator according to an embodiment of the present disclosure includes a cabinet having a storage chamber formed therein, a door configured to open or close the cabinet, a water purifying apparatus provided in the storage space to purify supplied water, and a dispenser provided on the door and configured take out water purified by the water purifying apparatus, wherein the water purifying apparatus includes a filter configured to purify incoming water and discharges the purified water, a head in which the filter is detachably coupled and a water inlet portion and a water outlet portion are formed, a shaft provided inside the head and rotatably mounted between the water inlet portion and the water outlet portion, the shaft being provided with a bypass flow path directly connecting the water inlet portion and the water outlet portion and a filtering flow path connected so that water flowing in through the water inlet portion is discharged to the water outlet portion via the filter, wherein the shaft is provided with an inner pipe communicating with the filter to form a portion of the filtering flow path and coupled to one end portion of the filter, and wherein the shaft includes a reinforcing portion projecting from an inner surface of the inner pipe and extending upward from a lower end of the inner pipe.

The details of one or more embodiments are set forth in the accompanying drawings and the description below. Other features will be apparent from the description and drawings, and from the claims.

BRIEF DESCRIPTION OF THE DRAWINGS

FIG. 3 is a view schematically illustrating a disposition structure of a water supplying flow path of the refrigerator.

DETAILED DESCRIPTION OF THE EMBODIMENTS

Hereinafter, specific embodiments of the present invention will be described in detail with reference to the drawings. However, the present invention is not limited to the embodiment in which the concept of the present invention is presented and other embodiments which are included in the scope of spirit of another degenerate invention or the present invention is capable of being easily suggested by another component being added, changed, deleted, or the like.

Figure 1:
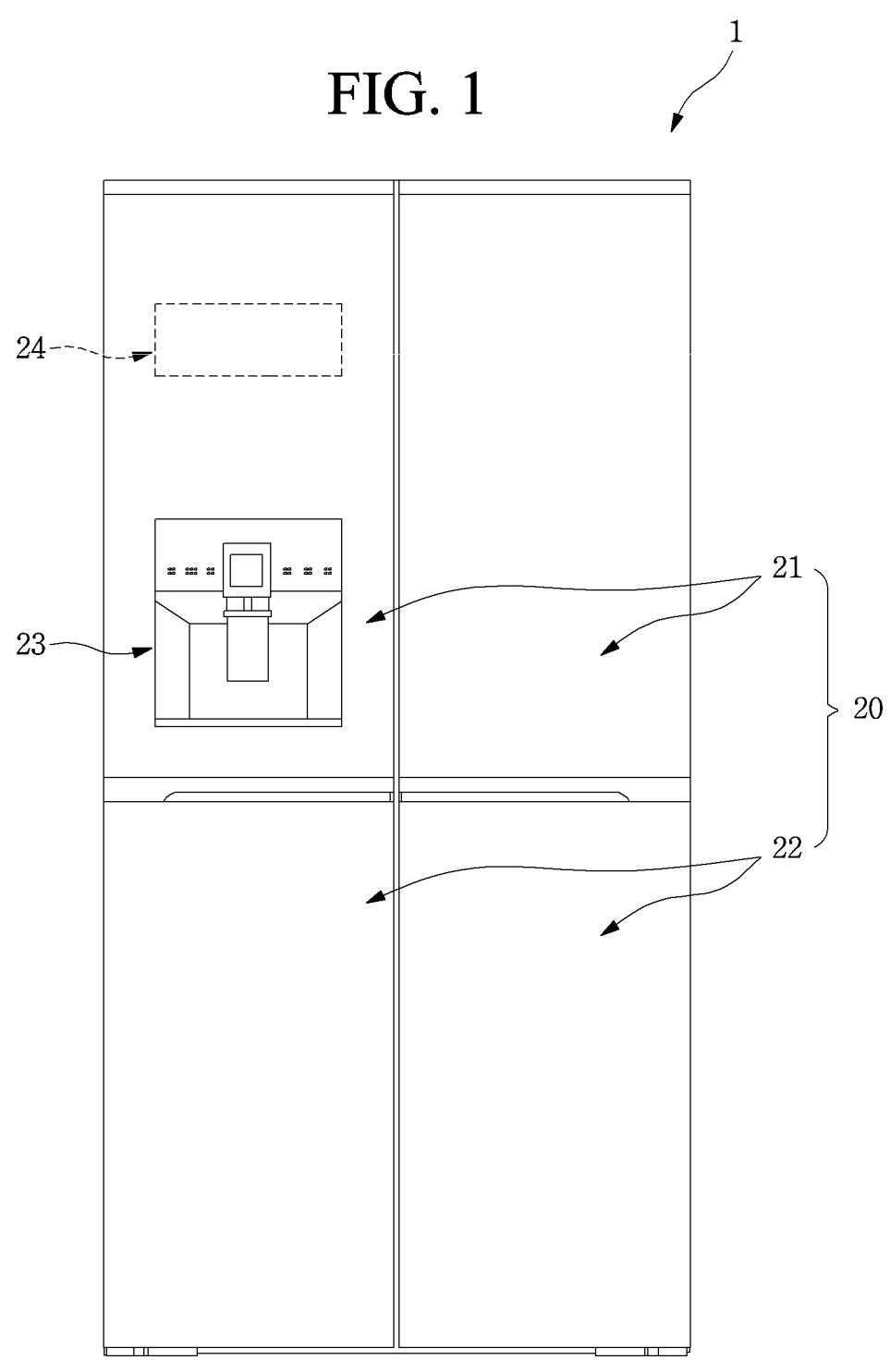
FIG. 1 is a front view illustrating a refrigerator according to an embodiment.
Figure 2:
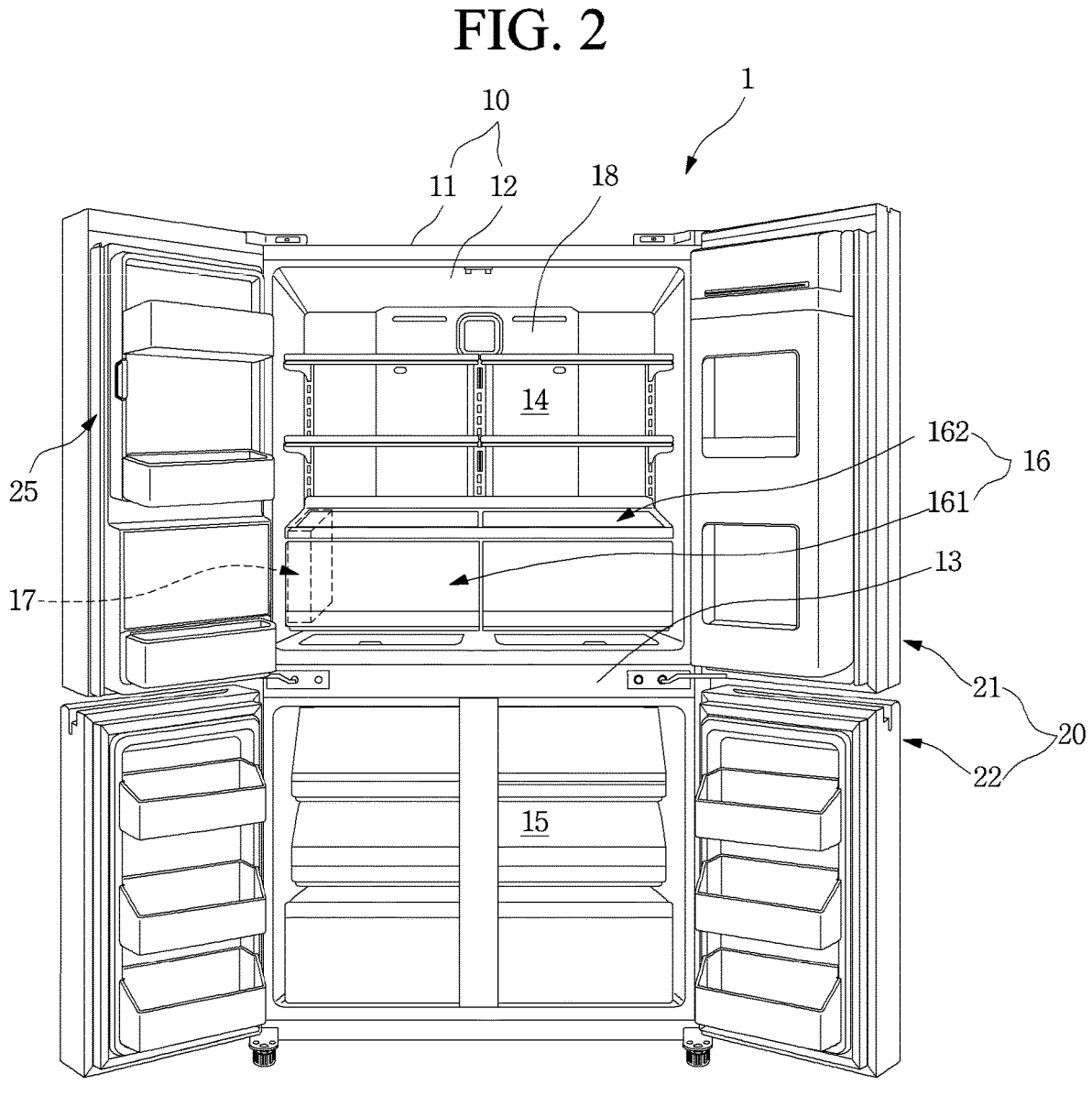
FIG. 2 is a front view illustrating a state where a door of the refrigerator is opened.

FIG. 1 is a front view illustrating a refrigerator according to an embodiment. FIG. 2 is a front view illustrating a state where a door of the refrigerator is opened.

With reference to FIG. 1 and FIG. 2, an outer appearance of a refrigerator 1 which includes a water purifying apparatus according to an embodiment may be formed by a cabinet 10 that forms a storage space, and a door 20 that opens and closes the storage space of the cabinet 10.

The cabinet 10 may include an outer case 11 made of a metal material forming the outer surface and an inner case 12 made of a resin material which is coupled with the outer case 11 and forming a storage space in an inside portion of the refrigerator 1. Insulation material is filled between the outer case 11 and the inner case 12 to insulate the space in the inside of the refrigerator 1.

The storage space is divided in a vertical direction based on a barrier 13, and may be configured by an upper refrigerating compartment 14 and a lower freezing compartment 15. The freezing compartment 15 may be further divided in a lateral direction. It will be apparent that the storage space may be divided into left and right compartments based on the barrier 13.

The door 20 may include a refrigerating compartment door 21 and a freezing compartment door 22, which independently open and close the refrigerating compartment 14 and the freezing compartment 15, respectively.

Both the refrigerating compartment door 21 and the freezing compartment door 22 may open and close the refrigerating compartment 14 and the freezing compartment 15 by rotation thereof. For this, both the refrigerating compartment door 21 and the freezing compartment door 22 may be rotatably connected to the cabinet 10 by a hinge device 26. In addition, the refrigerating compartment door 21 may be configured as a French type door configured such that a pair of doors independently rotate at both left and right sides.

A dispenser 23 and an ice maker 24 may be provided at one of the pair of refrigerating compartment doors 21.

The dispenser 23 is provided at a front surface of the refrigerating compartment door 21, and enables a user to take out water or ice by manipulating the dispenser 23 from the outside. An ice making compartment 25 is provided above the dispenser 23. The ice making compartment 25 is a heat insulating space in which ice is made and stored, and the ice maker 24 is accommodated in an inside portion of the ice making compartment and is capable of being opened and closed by a separate door. Although not shown in the drawings, the ice making compartment 25 may communicate with the freezing compartment 15 by a cool air duct in a state in which the refrigerating compartment door 21 is closed, and may receive cool air necessary for the ice making from a freezing compartment evaporator (not shown).

Meanwhile, a plurality of shelves and drawers for storing foods may be provided in the refrigerating compartment 14. Particularly, a drawer assembly 16 may be provided on a bottom surface of the refrigerating compartment 14. The drawer assembly 16 may include a drawer 161 provided to be slidable and a table 162 that shields a top surface of the drawer 161.

The drawer assembly 16 may be configured such that the inside thereof can be seen therethrough, and a main water tank 34 (see FIG. 3) provided at a rear side of the refrigerating compartment 14 may be shielded by the drawer 161. A water purifying apparatus 17 may be provided at the side of the drawer assembly 16 for purifying water to be supplied and then supplying the purified water to the dispenser 23 and the ice maker 24. The water purifying apparatus 17 may be disposed between the accommodating space and the wall surface of the drawer 161 and may be shielded by a front surface of the drawer 161. Therefore, in a state where the drawer 161 is closed, the water purifying apparatus 17 is not exposed to the outside, and in a state where the drawer 161 is withdrawn, the water purifying apparatus is exposed to the outside and thus access to the water purifying apparatus 17 is capable of being performed. Of course, the mounting position of the water purifying apparatus 17 is not limited to one side of the drawer 161 and may be provided in the region of the refrigerating compartment 14 including the refrigerating compartment 14 or the refrigerating compartment door 21.

A plurality of shelves having a cantilever structure may be detachably provided above the drawer assembly 16 such that their heights are adjustable. A main duct 18 is provided on a rear surface of the refrigerating compartment 14 and cool air generated from an evaporator (not shown) may be supplied to the inside portion of the refrigerating compartment 14 through a plurality of discharging ports which are formed in a main duct 18.

Figure 3:
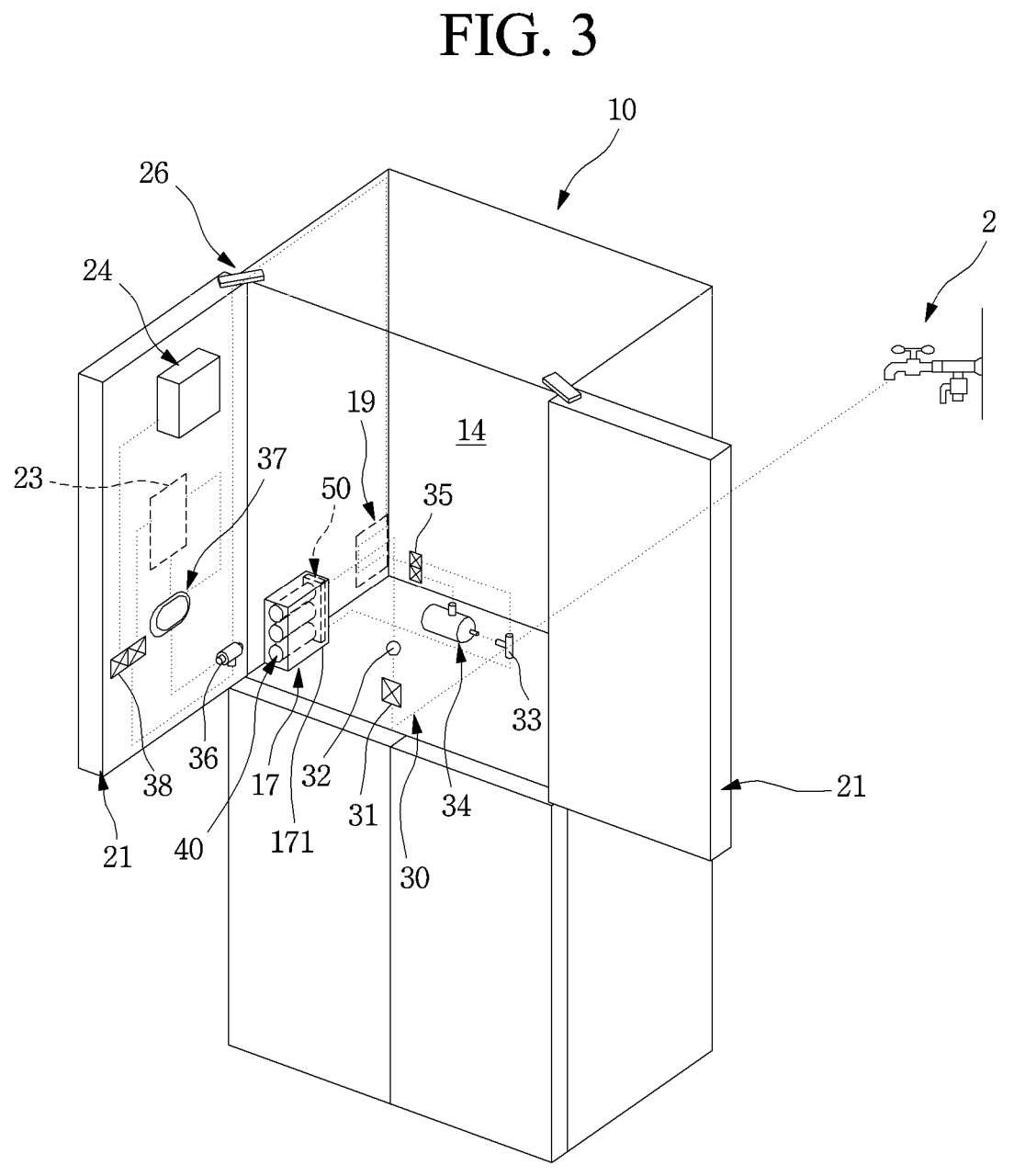

FIG. 3 is a view schematically illustrating a disposition structure of a water supplying flow path of the refrigerator.

With reference to FIG. 3, the refrigerator 1 may include a water supplying flow path 30 that purifies or cools water supplied from an external water supply source and then takes out water from the dispenser 23, or supplies the purified water to the dispenser 23 or the ice maker 24.

The water supplying flow path 30 may be directly connected to a water supply source 2 such as a water supply pipe at the outside of the refrigerator, and be introduced into a space of the refrigerator through a tube guide 19 mounted in the cabinet 10 to be connected to an inlet portion of the water purifying apparatus in the refrigerator.

The water supplying flow path 30 may include a water supply valve 31 and a flow rate sensor 32. The flow rate sensor 32 may be integrally formed with the water supply valve 31, if necessary.

The water supplying flow path 30 may connect the water purifying apparatus 17 and a first branch pipe 33 with each other and the water supplying flow path 30 branched from the first branch pipe 33 may be connected to the main water tank 34 and a first branch valve 35, respectively.

The water supplying flow path 30 which is connected to an outlet portion of the first branch valve 35 extends along an upper surface after extending along a side wall of the inside of the cabinet 10 or a rear wall surface of the outside of the cabinet 10 through the tube guide 19 and may be introduced into the refrigerating compartment door 21 via the hinge device 26.

The water supplying flow path of the refrigerating compartment door 21 may be branched by a second branch pipe 36 and connected to an inlet portion of a sub water tank 37 and a second branch valve 38. The sub water tank 37 is connected to the dispenser 23 so that cooled water is capable of being taken out through the dispenser 23.

An outlet portion of the second branch valve 38 is respectively connected to the dispenser 23 and the ice maker 24 by the water supplying flow path 30 to be capable of supplying purified water to the dispenser 23 and the ice maker 24.

The water purified through the water purifying apparatus 17 may be cooled and then supplied to the dispenser 23 or may be supplied to the dispenser 23 or the ice maker 24 in a state of being purified without being cooled.

The water purifying apparatus 17 may include a plurality of filters 40 for purifying supplied water and a head unit 50 to which the plurality of filters 40 are coupled and which is connected a flow path through which water flows. The water purifying apparatus 17 may further include a case 171 in which the filters 40 and the head unit 50 are accommodated.

Figure 4:
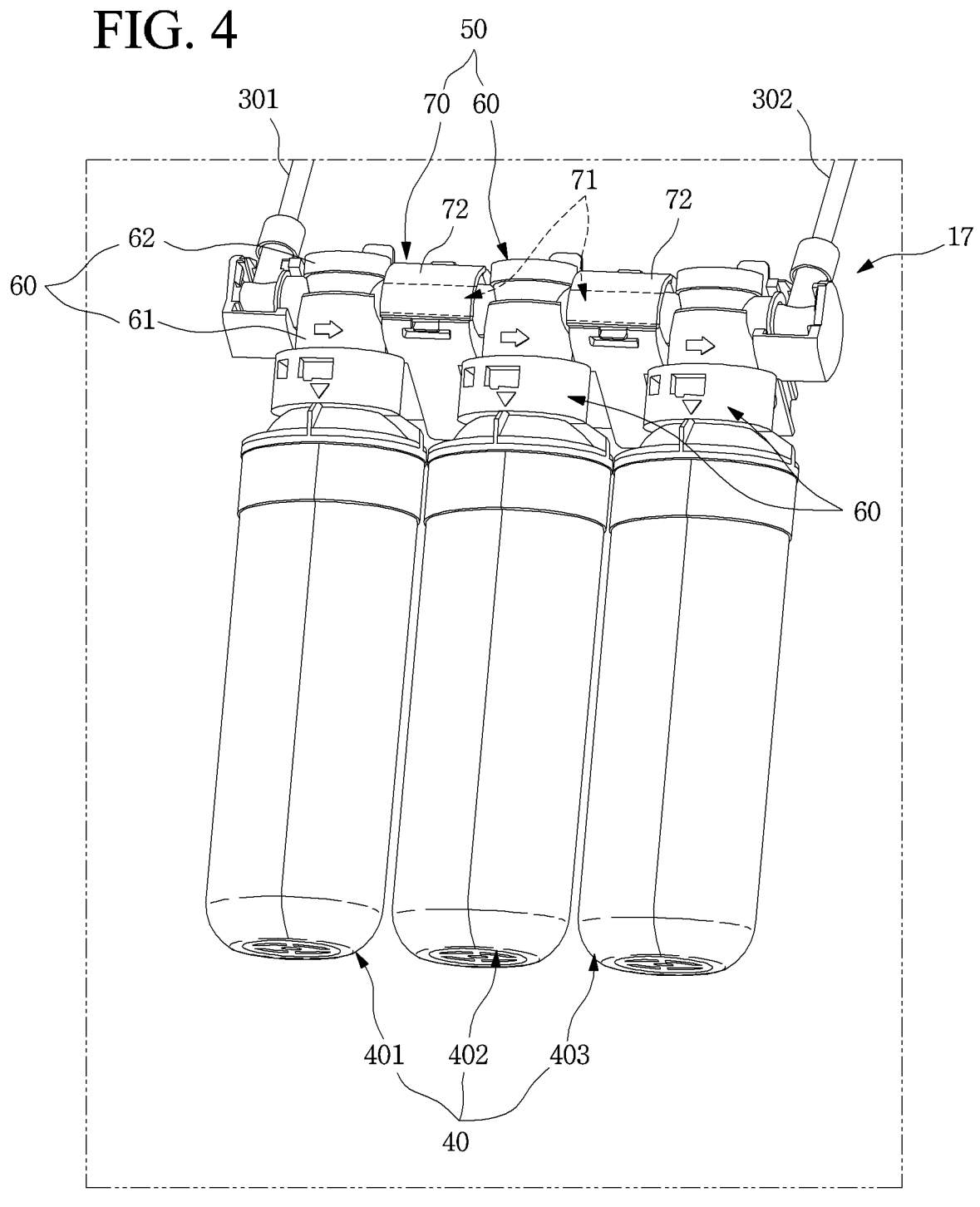
FIG. 4 is a perspective view illustrating a structure of a water purifying apparatus.

FIG. 4 is a perspective view illustrating the structure of the water purifying apparatus.

With reference to FIG. 4, the water purifying apparatus 17 may include the plurality of filters 40 and the head unit 50.

The plurality of filters 40 may include a first filter 401 which is connected to a water inlet side of the head unit 50, a third filter 403 which is connected to a water outlet side of the head unit 50, and a second filter 402 disposed between the first filter 401 and the third filter 403 and thus is capable of purifying water. However, it is not limited to this.

The first filter 401 may be a pre-carbon filter, the second filter 402 may be a membrane filter, and the third filter 403 may be a post-carbon filter. Of course, the present invention is not limited to the number and types of the filters 40, and the number which is capable of being accommodated in the inside of the water purifying apparatus 17 and different types of functional filters from each other for effectively purifying water may be applied.

The head unit 50 may include a plurality of heads 60 to which each filters 40 is coupled and a mounting member 70 on which the head 60 is rotatably seated.

A water inlet pipe 301 for introducing original water is capable of being connected to one end of the mounting member 70, and a water outlet pipe 302 for discharging purified water is capable of being connected to the other end thereof.

The plurality of heads 60 may be independently rotated in a state where the plurality of heads 60 are mounted on the mounting member 70. The flow paths of the plurality of heads 60 are capable of being connected to each other by connecting pipes 71 and the original water which flows in through the water inlet pipe 301 is purified after passing through each of the filters 40 and then may be flows out from the water outlet pipe 302.

Each of the connecting pipes 71 is mounted on the mounting member 70 and is provided between adjacent two heads 60 to each other to allow water to flow between the heads 60. A cover 72 may be mounted on one side of the mounting member 70 which corresponds to the connecting pipe 71 to shield the connecting pipe 71.

The head 60 may include a head body 61 to which an upper end of the filter 40 is inserted and then fixed, and a shaft (90 in FIG. 6) connected to the upper end of the filter 40 in the inside portion of the head body 61 and thus forms a flow path through which water flows. The head 60 may further include a head cap 62 for shielding an upper surface of the head body 61 into which the shaft 90 is inserted.

The filter 40 may be fixedly mounted to the head 60 in a rotating manner and the shaft 90 may be connected to the filter 40 to form a flow path in a process of the filter 40 being mounted and when the filter 40 is rotated, the shaft 90 is rotated along with the filter 40 so that the flow path of the shaft 90 is capable of being switched.

In other words, in a case where the filter 40 is mounted, the flow path is switched to the filter 40 side by the shaft 90 so that the water is capable of being purified through the filter 40. In a case where the filter 40 is separated, the supplying water is capable of being bypassed without passing through the filter 40, and thus the flow path is capable of being switched so that water passes through the head 60. The switching and detailed structure of the flow path will be described in more detail in the following other embodiments.

The case 171 may have various structures which can accommodate the filter 40 and the head unit 50. The case 171 is capable of fully accommodating the filter 40 and the head unit 50. Alternatively, the case 171 may accommodate at least a portion of the filter 40 and the head unit 50.

The case 171 may have a structure which is capable of being fixedly mounted on one side of the inside portion of the refrigerating compartment 14. Of course, the case 171 may not be provided if necessary, and the mounting member 70 may be directly mounted on a side of the inner portion of the refrigerating compartment 14.

On the other hand, only one filter 40 may be provided according to the function of the water purifying apparatus 17, and in a case where only one filter 40 is provided, one head unit 50 and one mounting member 70 may be also provided. The structure of the head 60 may have the same structure irrespective of one head 60 or the plurality of the heads 60. Hereinafter, a water purifying apparatus having one filter 40 and one head 60 will be described.

Figure 5:
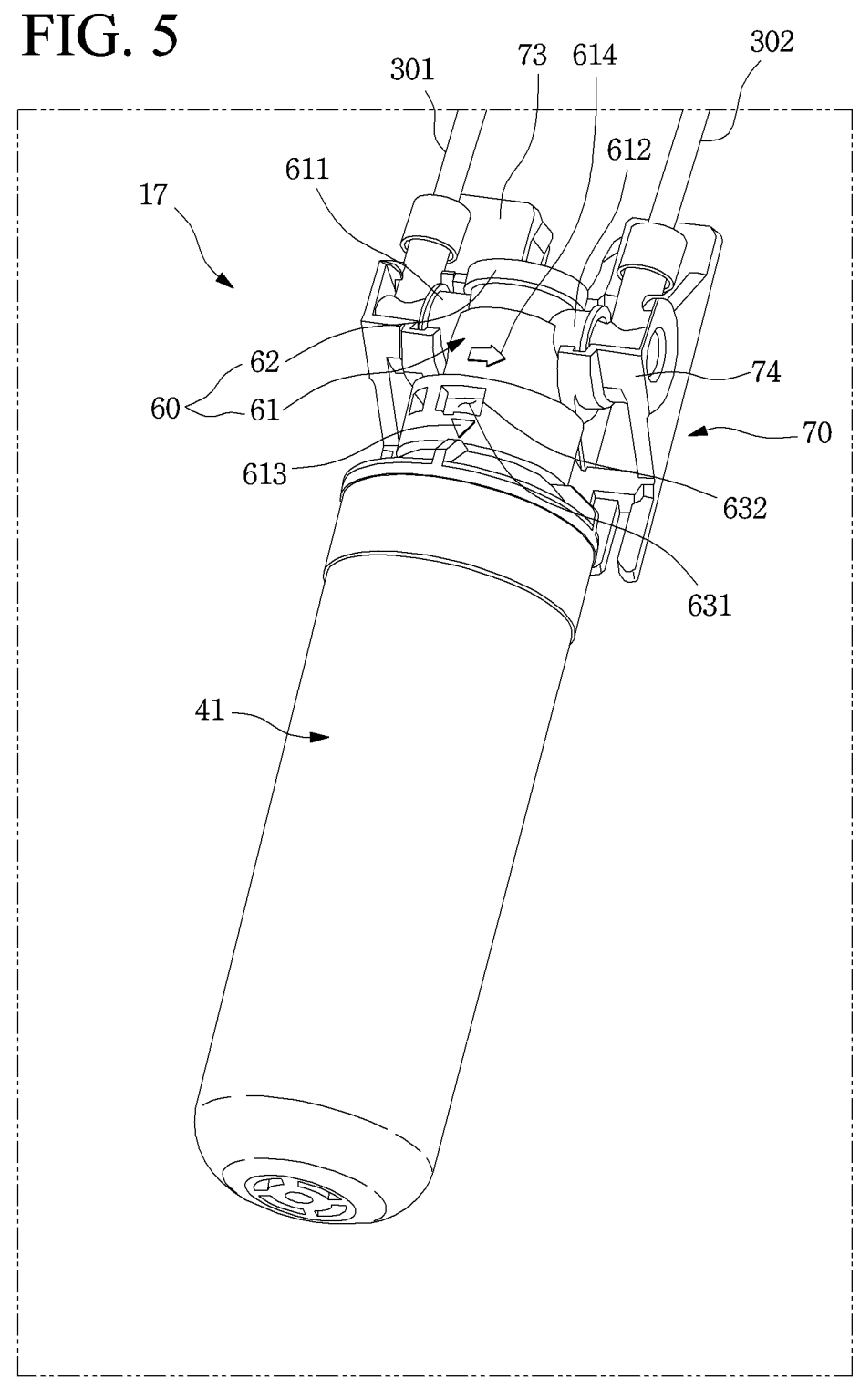
FIG. 5 is a perspective view illustrating a structure of a water purifying apparatus according to another embodiment.
Figure 6:
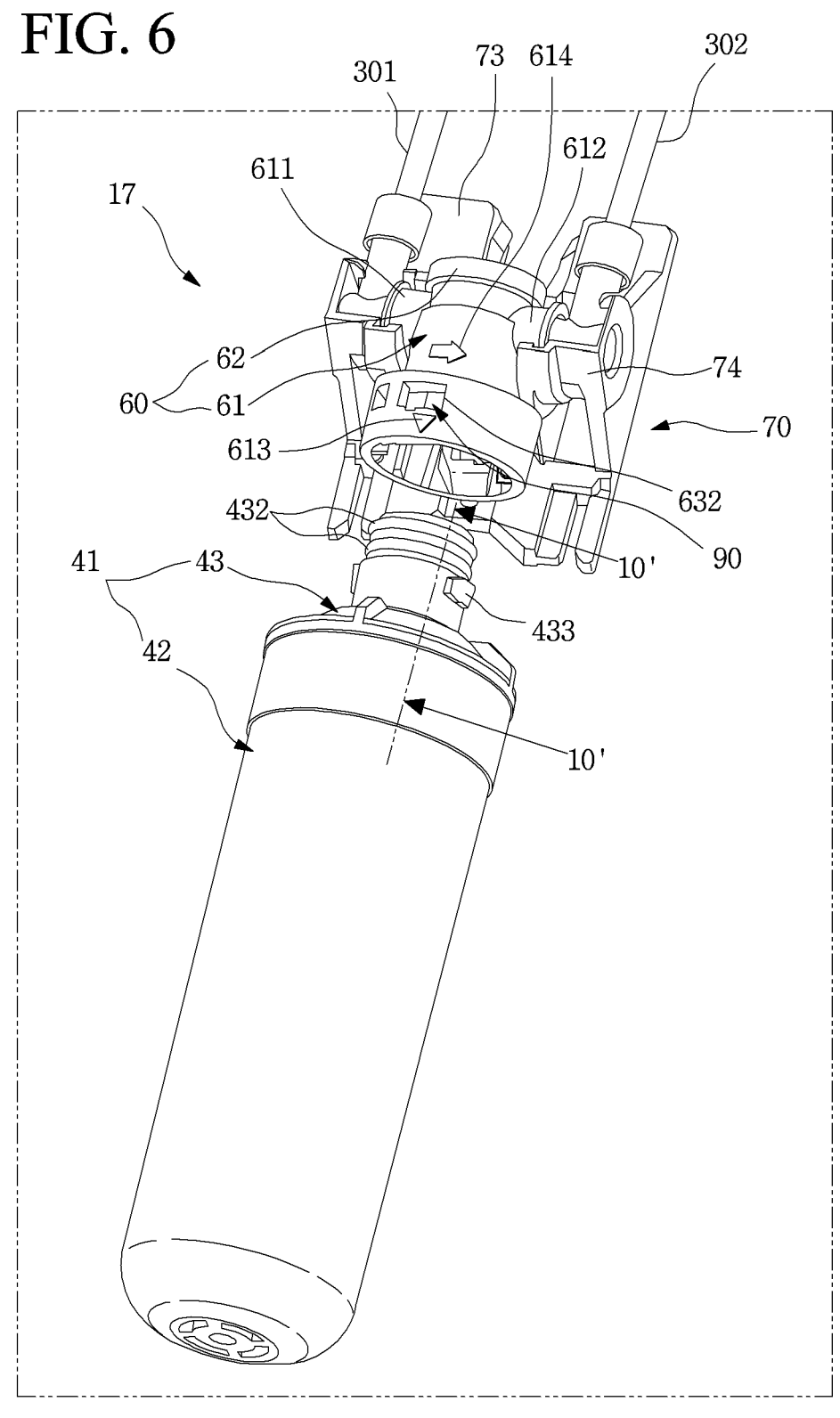
FIG. 6 is an exploded perspective view illustrating a state where a filter and a head of the water purifying apparatus are separated.

FIG. 5 is a perspective view illustrating a structure of a water purifying apparatus according to another embodiment. FIG. 6 is an exploded perspective view illustrating a state where a filter and a head of the water purifying apparatus are separated.

With reference to FIG. 5 and FIG. 6, a water purifying apparatus 17 according to another embodiment may include a filter 40 and a head 60. The water purifying apparatus 17 may further include a mounting member 70 on which the head 60 is mounted.

The filter 40 has a cylindrical shape, and the outer shape thereof is capable of being formed by the housing 41. The housing 41 may include a housing body 42 which accommodates a filtering member (44 in FIG. 7) in an inside portion thereof, and a housing cap 43 which is coupled to an upper end of the housing body 42 to form an upper portion of the housing 41.

The housing body 42 may have a cylindrical shape to define a first accommodating space for accommodating the filtering member 44. The housing body 42 may have an upper opening portion.

The housing cap 43 may be coupled to the upper opening portion of the housing body 42. The housing cap 43 may define a second accommodating space for accommodating a portion of the filtering member 44. For this, a portion of the housing cap 42 may have a cylindrical shape. The housing cap 43 has an upper opening portion. A portion of the shaft 90 to be described below is capable of being inserted through the upper opening portion of the housing cap 43.

The housing cap 43 may be inserted into an opened lower surface of the head 60. A pair of O-rings 432 may be provided at an upper end of the housing cap 43. The O-rings 432 may be hermetically sealed with the inner surface of the head 60 to prevent leakage.

A coupling projection 433 may be further provided on an outer circumferential surface of the upper portion of the housing cap 43. The coupling projection 433 is capable of being moved along a coupling groove 631 which is formed on an inner surface of the head 60 when the upper portion of the filter 40 is inserted into the inside of the head 60.

At this time, the coupling projection 433 and the coupling groove 631 may be formed in a direction intersecting a direction into which the filter 40 is inserted. Accordingly, the filter 40 is rotated in a state of being inserted into the inside of the head 60 and may have a structure in which the coupling projection 433 and the coupling groove 631 are coupled to each other by rotation of the filter 40. In a state where the filter 40 and the head 60 are fully coupled to each other, the supplying water is capable of flowing into the inside portion of the filter 40 by the filter 40 and the flow path of the head 60 being connected to each other in the inside portion thereof.

The mounting member 70 may include a base 73 which is mounted on one side wall surface of the refrigerator 1 or the case 171 and rotating support portions 74 which project from both sides of the base 73 and rotatably support both sides of the head 60.

End portions of the water inlet pipe 301 and the water outlet pipe 302 are disposed on the rotating support portion 74 and the water inlet pipe 301 and the water outlet pipe 302 may be connected to a water inlet portion 611 and a water outlet portion 612 of the head 60 at the rotating support portion 74.

The head 60 may be rotatably mounted on the mounting member 70 by the rotating support portion 74. Therefore, a space for attachment and detachment of the filter 40 can be secured by operating rotation or tilting of the head 60 at the time of attachment and detachment of the filter 40 and thus the operation for the attachment and detachment of the filter 40 is capable of being easily performed.

The head 60 may be formed in a cylindrical shape having an opened lower surface. The head 60 may include a head body 61 to which the filter 40 is inserted and fixed and a shaft 90 which is accommodated in the inside of the head body 61. In addition, the head 60 may further include a head cap 62 which shields an opened upper surface of the head body 61.

An insertion indicating portion 613 for indicating an insertion position of the coupling projection 433 may be formed on the outer surface of the head body 61. The insertion indicating portion 613 may be formed by printing, molding or machining. The user can recognize the position of the coupling groove 631 by the insertion indicating portion 613, and may easily perform alignment between the coupling projection 433 and the coupling groove 631.

In addition, a rotation indicating portion 614 for indicating the rotational direction of the filter 40 may be formed on the outer surface of the head body 61. The rotation indicating portion 614 may also be formed by printing, molding or machining. The engagement projection 433 may be moved along and coupled to the inside of the coupling groove 631 by the user operating rotation of the filter 40 in a correct direction by the rotation indicating portion 614.

An opening portion 632 for checking the engaging restraint state of the coupling projection 433 may be further formed on the outer surface of the head body 61. The opening portion 632 may be formed at a position which corresponds to the position of the coupling groove 631 or may include at least a portion of the coupling groove 631.

Figure 7:
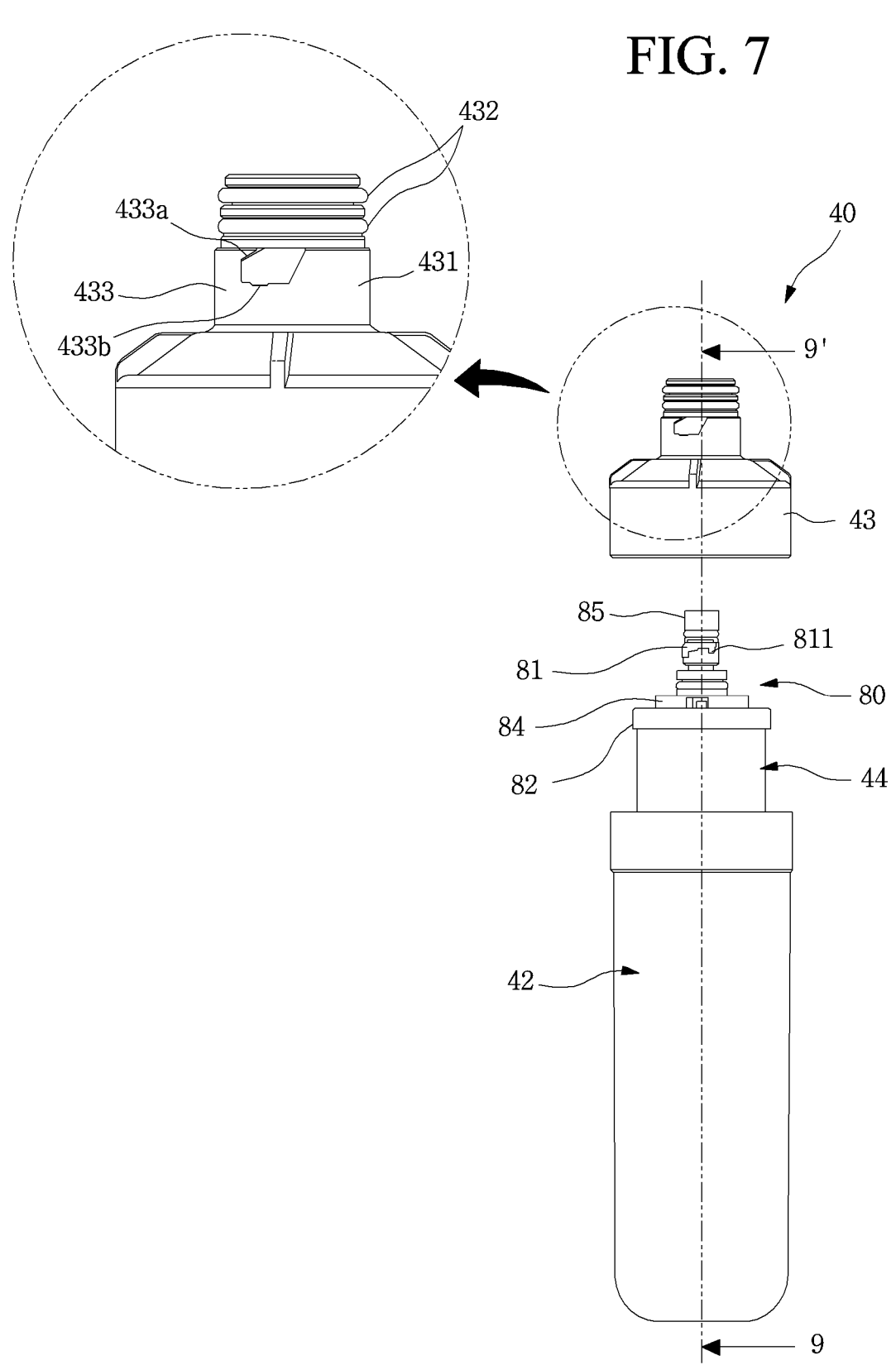
FIG. 7 is an exploded view illustrating the structure of the filter.
Figure 8:
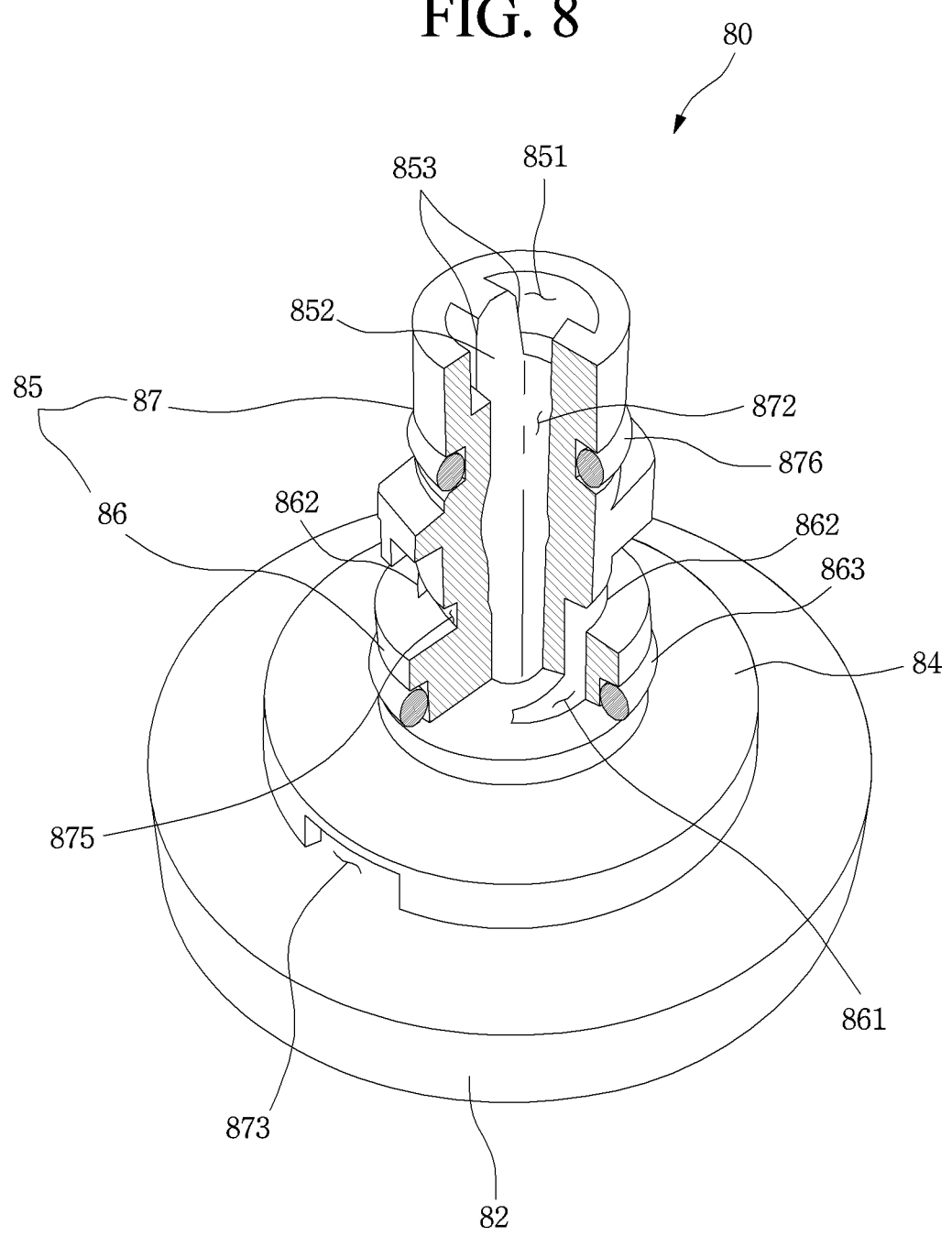
FIG. 8 is a partially cutaway perspective view illustrating an upper supporter of the filter.

FIG. 7 is an exploded view illustrating the structure of the filter. FIG. 8 is a partially cutaway perspective view illustrating an upper supporter of the filter.

With reference to the drawings, in a case where the structure of the filter 40 describes in more detail, the filter 40 may include a filter housing 41 which forms an outer shape, a filtering member 44 provided in the filter housing 41, and an upper supporter 80 for supporting the filtering member 44.

The filter housing 41 is formed in a cylindrical shape, and may be formed by the housing body 42 and the housing cap 43 being coupled to each other. A filter inserting portion 431 is formed on the upper end of the housing cap 43. A plurality of O-rings 432 may be vertically arranged in the filter inserting portion 431.

The coupling projection 433 may be formed on a lower side of the plurality of O-rings 432 on the outside of the filter inserting portion 431. A pair of coupling projections 433 may be formed at positions which are opposite to each other, and may be formed to have a size that is capable of being inserted into the coupling groove 631.

The coupling projection 433 may include a projection guide portion 433a. The projection guide portion 433a may be formed to have a slope or a predetermined curvature on the upper surface of the coupling projection 433. The coupling projection 433 is in contact with a groove guide portion 633 for guiding the coupling projection 433 to the entrance of the coupling groove 631 so as to guide rotation of the coupling projection 433 in one direction.

A restraining projection 433b which projects to a lower side may be further formed on one side of the lower surface of the coupling projection 433. The restraining projection 433b may be engaged with the inside of the coupling groove 631 to be restrained. Accordingly, the filter 40 is capable of being fixed to the inside of the head 60 in a state where the coupling projection 433 is fully inserted into the inside of the coupling groove 631.

On the other hand, the upper supporter 80 is capable of being accommodated in the second accommodating space in which the housing cap 43 is defined. The upper supporter 80 may be coupled to the upper portion of the filtering member 44 and the inner surface of the housing cap 43, respectively.

A supporter fastening portion 81 may be formed on the upper supporter 80. As an example, the supporter fastening portion 81 may be formed on the second extending portion 87. A hook portion 811 is formed at one end of the supporter fastening portion 81.

In a case where the upper end of the upper supporter 80 is fully rotated in a state of being inserted into the filter inserting portion 431, the hook portion 811 of the supporter fastening portion 81 is engaged to the end portion of the housing fastening portion 434 and thus the upper supporter 80 is capable of being coupled to the housing cap 43.

When the filter 40 is rotated at the time of the filter 40 being mounted, the upper supporter 80 may be also rotated along with the filter 40.

On the other hand, the filtering member 44 may be accommodated in the inside of the filter housing 41. The filtering member 44 allows the incoming water to pass through and thus be purified. For example, the filtering member 44 may be a commonly used carbon filter or a membrane filter, and various types of filters may be used depending on the required purifying performance in addition to this.

The filtering member 44 may be formed in a cylindrical shape having a hollow 441 formed at the center thereof in the vertical direction and the upper supporter 80 and the lower supporter 45 are coupled to the upper end and the lower end of the filtering member 44 so that the filtering member 44 is capable of being fixedly mounted on the inside of the filter housing 41.

An outer diameter of the filtering member 44 is formed to be smaller than the inner diameter of the filter housing 41 and a space for flowing water between the filter housing 41 and the outer surface of the filtering member 44 may be formed.

The upper supporter 80 is disposed at the upper end of the filtering member 44 and may extend in the upper direction to form a passage connecting the inlet portion of the filter inserting portion 431 and the hollow 441 to each other. Accordingly, water supplied from the head 60 is capable of flowing into the filtering member 44 through the filter inserting portion 431 and water purified in the filtering member 44 flows out to the head 60.

The upper supporter 80 may include a supporter accommodating portion 82 for accommodating the upper end of the filtering member 44.

The upper supporter 80 may further include a supporter inserting portion 83 which extends from a central portion of the supporter accommodating portion 82 in the lower direction and is inserted into the hollow 441 of the filtering member 44.

The upper supporter 80 may further include a supporter stepped portion 84 which projects from the upper surface of the supporter inserting portion 83 in the upper direction.

The upper supporter 80 may further include a supporter extending portion 85 extending from the center of the upper surface of the supporter stepped portion 84 toward the inside of the filter inserting portion 431.

When the upper supporter 80 and the filtering member 44 are coupled to each other, the supporter accommodating portion 82 may surround the upper surface and a circumference of the filtering member 44. The supporter inserting portion 83 is inserted into the hollow 441 and is in contact with an inner surface of the filtering member 44 so that the upper supporter 80 is capable of being fixedly mounted on the upper surface of the filtering member 44.

The inside portion of the supporter inserting portion 83 is formed to be hollow and is capable of communicating with a filter outlet flow path 861 formed on the supporter extending portion 85. Accordingly, the purified water flowing into the hollow 441 of the filtering member 44 may pass through the supporter inserting portion 83, the filter outlet flow path 861 and a filter outlet port 862 of the end portion of the filter outlet flow path 861 in this order and may be discharged through the opening of the filter inserting portion 431.

The supporter stepped portion 84 projects from the upper surface of the supporter accommodating portion 82 and may be formed to have a smaller diameter than the supporter accommodating portion 82. The circumference of the supporter stepped portion 84 and the supporter accommodating portion 82 may be spaced apart from the inner surface of the housing cap 43 when the housing cap 43 and the upper supporter 80 are coupled to each other.

The supporter extending portion 85 may extend from the center of the supporter stepped portion 84 in the upper direction. The supporter extending portion 85 is located in the filter inserting portion 431 when the housing cap 43 and the upper supporter 80 are coupled to each other. A filter inlet flow path 871 and a filter outlet flow path 861 may be formed in the inside of the supporter extending portion 85. Therefore, water supply into the inside portion of the filter 40 and discharge of the purified water from the filter 40 is capable of being performed through the supporter extending portion 85.

Specifically, a first filter inlet flow path 872 extending in a lower direction is formed on the opened upper surface of the supporter extending portion 85. The supporter stepped portion 84 may include a second filter inlet flow path 873 passing across the supporter stepped portion 84.

The second filter inlet flow path 873 may have an opening formed in a circumferential surface of the supporter stepped portion 84 and extend toward the center of the supporter stepped portion 84. The first filter inlet flow path 872 and the second filter inlet flow path 873 may be connected to each other at a lower end of the supporter extending portion 85, that is, at the inside of the supporter stepped portion 84.

Accordingly, the water which flows into through the filter inserting portion 431 flows into through the first filter inlet flow path 872 of the supporter extending portion 85 and then be moved along the second filter inlet flow path 873 which is branched into both sides at the lower end of the first filter inlet flow path 872 to the outside and thus is capable of being discharged through an opening of the circumference of the supporter stepped portion 84.

The water which is discharged through the filter inlet flow path 871 flows along the space between the filter housing 41 and the filtering member 44. The water which flows into the outside of the filtering member 44 may be purified in the process of coming in the hollow 441 through the filtering member 44.

On the other hand, the supporter extending portion 85 may include a first extending portion 86 which extends from the upper surface of the supporter stepped portion 84 and a second extending portion 87 which extends from the first extending portion 86 in the upper direction. The first extending portion 86 may be formed to have an outer diameter which is larger than that of the second extending portion 87 and the filter outlet port 862 may be formed on the upper side portion of the first extending portion 86.

At this time, the filter outlet flow path 861 may be defined in a space between an inner surface of the first extending portion 86 and an outer surface of the second extending portion 87. The first filter inlet flow path 872 may extend from the opened upper surface of the second extending portion 87 to the lower end thereof.

On the other hand, the outer diameter of the first extending portion 86 is formed to be somewhat smaller than the inner diameter of the filter inserting portion 431 and the purified water which is discharged through the filter outlet port 862 is capable of being discharged through a space between the first extending portion 56 and the filter inserting portion 431.

An outlet port groove 875 may be formed in the filter outlet port 862. The outlet port groove 875 may be formed to be recessed along the circumference of the second extending portion 87. Accordingly, the water which is discharged from the filter outlet ports 862 which are disposed on both sides is capable of flowing along the outlet port groove 875 and is capable of being discharged along the water outlet guide portion 965b formed on the outer surface of the shaft 90.

The outer diameter of the second extending portion 87 may be formed to correspond to the inner diameter of the shaft 90 which is located in the inside of the filter inserting portion 431. Therefore, in a case where the second extending portion 87 and the shaft 90 are coupled to communicate with each other, water supplied through the inside of the shaft 90 is capable of coming in the inside of the second extending portion 87.

A first extending portion O-ring 863 may be provided on the outside of the first extended portion 86 and a second extending portion O-ring 876 may be provided on the outside of the second extending portion 87.

Therefore, the purifying water which flows into the inside of the supporter extending portion 85 and the purified water which is discharged to the outside of the supporter extending portion 85 may flow through independent flow paths respectively without leakage or mixing with each other.

On the other hand, a first connecting portion 851 may be formed on the upper end of the supporter extending portion 85. The first connecting portion 851 is formed to be recessed toward the inside from the upper end of the supporter extending portion 85 and may be formed to be symmetrical to both the left side and the right side thereof. The first connecting portion 851 may be formed in a corresponding shape to that of the second connecting portion 972 of the shaft 90 to be described below so as to be engaged each other in a case where the second connecting portion 972 is inserted into the first connecting portion 851. The shaft 90 and the filter 40 may be rotated together in a state where the first connecting portion 851 and the second connecting portions 972 are coupled to each other.

The first connecting portion 851 may be formed to be symmetrical with respect to a projecting portion 852 projecting from a position which is opposite to the inner surface of the supporter extending portion 85 while being recessed in a predetermined depth. A first inclined surface 853 may be formed on both side ends of the first connecting portion 851, that is, on both side surfaces of the projecting portion 852. The first inclined surface 853 may be formed in a shape that the width of the first connecting portion 851 gradually increases and the width of the projecting portion 852 gradually decreases from the lower side to the upper side of the first inclined surface. In other words, the first connecting portion 851 may be formed so that the width thereof is gradually narrowed toward the depth direction to be recessed.

Due to such a structure, the first connecting portion 851 and the second connecting portion 972 are capable of being easily assembled. In addition, in a case where the torsion moment is applied in a state where the first connecting portion 851 and the second connecting portion 972 are in contact with each other, the first connecting portion 851 and the second connecting portion 972 are slid so that the filter 40 is capable of being easily separated from the shaft 90.

Figure 9:
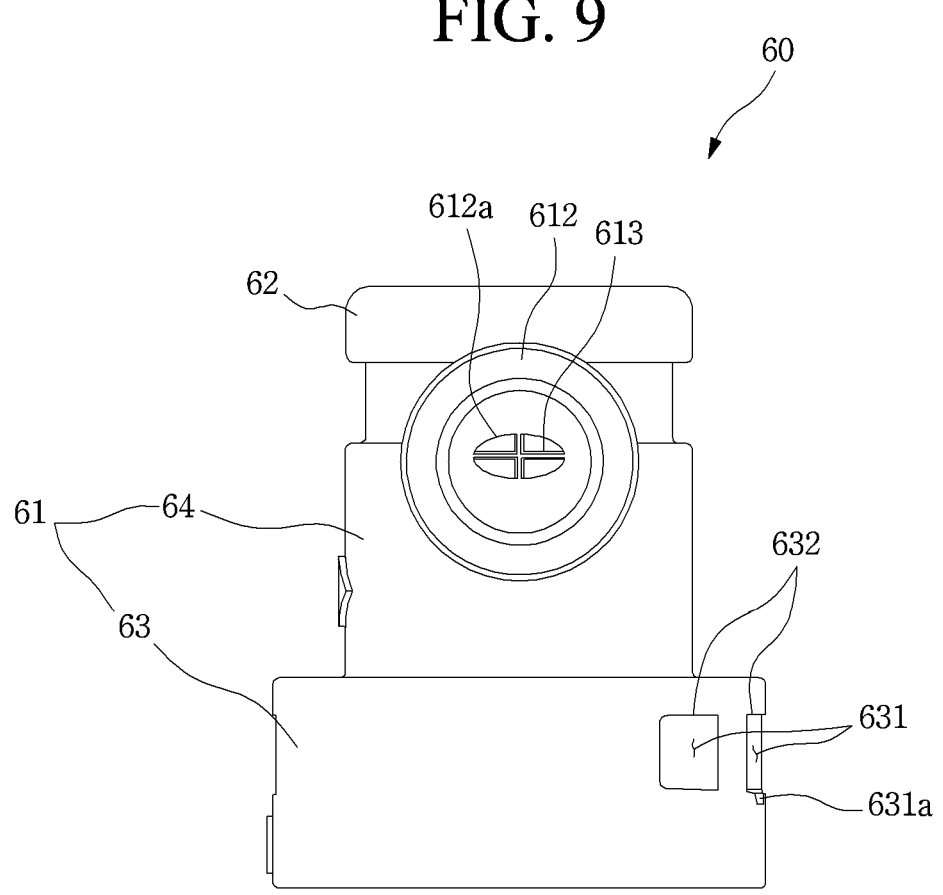
FIG. 9 is a side view illustrating the head.
Figure 10:
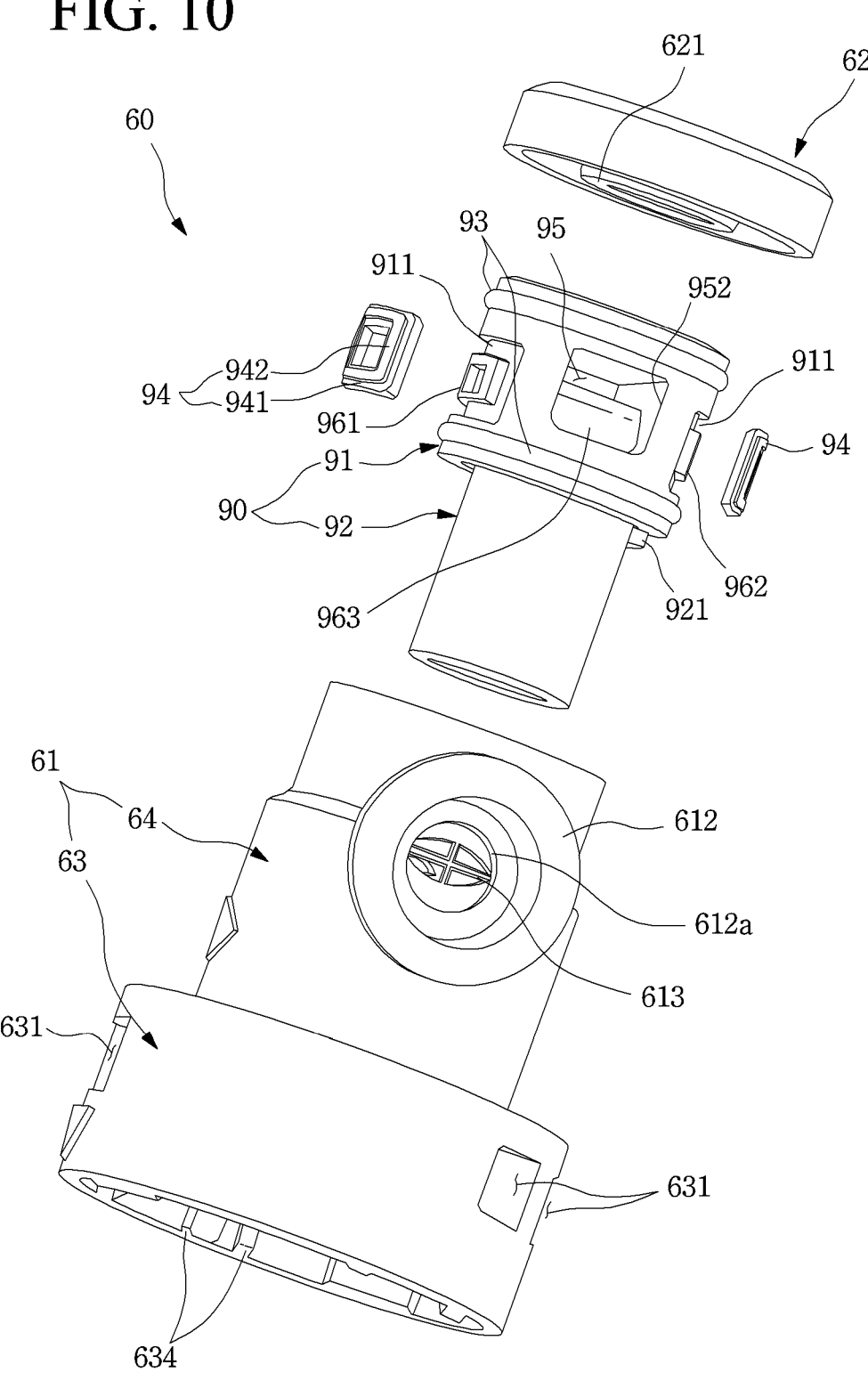
FIG. 10 is an exploded perspective view illustrating a coupling structure of the head viewed from one side.
Figure 11:
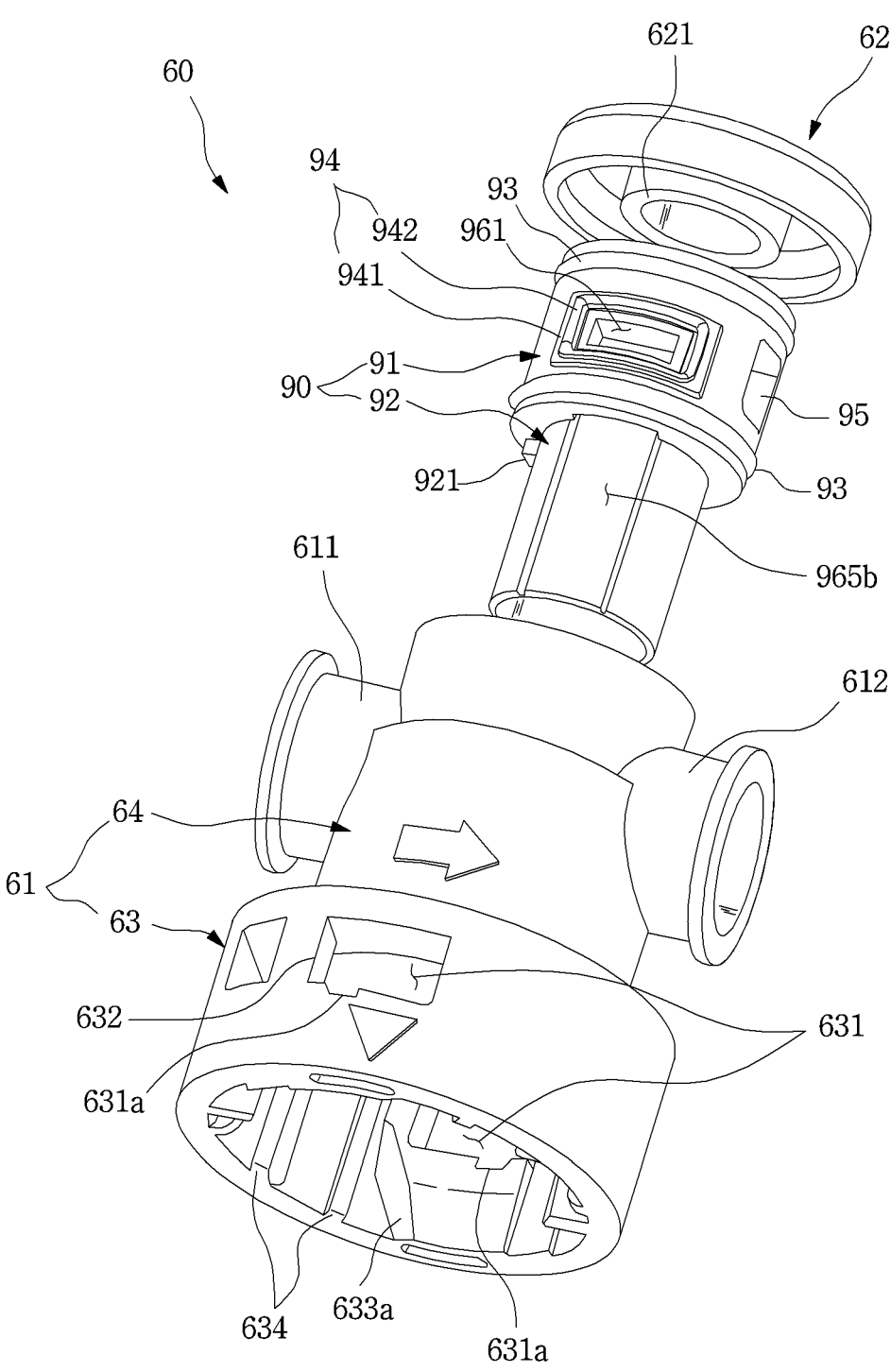
FIG. 11 is an exploded perspective view illustrating the coupling structure of the head viewed from the other side.

FIG. 9 is a side view illustrating the head. FIG. 10 is an exploded perspective view illustrating a coupling structure of the head viewed from one side. FIG. 11 is an exploded perspective view illustrating the coupling structure of the head viewed from the other side.

With reference to the drawings, when the structure of the head 60 will be described in more detail, the shaft 90 is inserted through the opened upper surface of the head body 61 and the head cap 62 is capable of shielding the opened upper surface of the head body 61.

The head body 61 may include a lower body 63 and an upper body 64.

The lower body 63 is a portion into which the filter inserting portion 431 is inserted and to which the filter inserting portion 43 is coupled and the lower surface of the lower body 63 is opened so that the filter 40 is capable of being accommodated. The coupling groove 631 for inserting the coupling projection 433 may be formed on the lower body 63.

An opening portion 632 for forming the coupling groove 631 may be formed on the lower body 63 and the insertion state of the coupling projection 433 may be confirmed through the opening portion 632. A plurality of supporting ribs 634 for supporting the outer side of the filter inserting portion 431 may be formed on the circumference of the inner surface of the lower body 63 in order to prevent the filter 40 from sagging in a state where the filter inserting portion 431 is inserted into the lower body 63.

The upper body 64 may be formed at an upper end of the lower body 63 and may be formed to have a smaller diameter than that of the lower body 63. The shaft 90 may be mounted on the inside of the upper body 64 and the shaft 90 is inserted through the opened upper surface of the upper body 64 and thus may be mounted on the inside of the upper body 64.

The upper end of the filter inserting portion 431, the upper end of the supporter extending portion 85 and the lower end of the shaft 90 may be disposed on the inside of the upper body 64 and a flow path through which purified water through the filter 40 is capable of flowing is formed by coupling portions which is configured as described above with each other.

A water inlet portion 611 and a water outlet portion 612 are formed to project to the outside in the upper body 64. The water inlet portion 611 and the water outlet portion 612 may communicate with a water inlet pipe 301 and a water outlet pipe 302, respectively. At this time, the water inlet portion 611 and the water outlet portion 612 are capable of selectively communicating with the flow path formed in the shaft 90. The water inlet portion 611 and the water outlet portion 612 may be disposed on in a straight line so as to face each other in the head.

The head cap 62 may shield the upper surface of the upper body 64. The head cap 62 presses the upper surface of the shaft 90 so that the shaft 90 is capable of maintaining a state of being fixedly mounted on the inside of the upper body 64. To this end, a cap support portion 621 extending to the upper surface of the shaft 90 may be further formed on a lower surface of the head cap 62.

The shaft 90 is capable of selectively switching the flow path of water flowing in the inside of the head 60 and is capable of being rotatably seated on the upper body 64. A filtering flow path 96 and a bypass flow path 95 are formed in the shaft 90. The flow paths may be selectively connected to the water inlet portion 611 and the water outlet portion 612 by the rotation of the shaft 90.

The shaft 90 may include an upper part 91 and a lower part 92. The upper part 91 may be formed to have a larger diameter than that of the lower part 92 and have an outer diameter corresponding to the inner diameter of the upper body 64.

A shaft O-ring 93 may be provided at the upper end and the lower end of the upper part 91, respectively. The shaft O-ring 93 hermetically seals between the shaft 90 and the inner surface of the upper body 64 to prevent leakage of water flowing through the head 60.

A shaft inlet port 961 and a shaft outlet port 962 are formed on the circumference of the upper part 91 between the plurality of shaft O-rings 93, respectively. The shaft inlet port 961 and the shaft outlet port 962 may be formed at positions facing each other and at positions corresponding to the water inlet portion 611 and the water outlet portion 612. Therefore, water which passes through the water inlet portion 611 is capable of coming in the shaft inlet port 961, and water which passes through the shaft outlet port 962 is capable of being discharged through the water outlet portion 612.

On the other hand, the shaft inlet port 961 and the shaft outlet port 962 may be formed in a rectangular shape; however it is not limited to this. A sealing member mounting portion 911 on which a sealing member 94 is mounted may be formed on the circumference of the shaft inlet port 961 and the shaft outlet port 962. The sealing member mounting portion 911 and the sealing member 94 may be formed in a rectangular shape corresponding to the shaft inlet port 961 and the shaft outlet port 962.

At this time, the sealing member 94 may include a pressing portion 941 which is pressed into and mounted on the inside of the sealing member mounting portion 911 and a sealing portion 942 which projects along the circumference of the pressing portion 941. The sealing portion 942 is in contact with the inner surface of the upper body 64 when the shaft 90 is mounted. Accordingly, when the shaft inlet port 961 and the shaft outlet port 962 are connected to the water inlet portion 611 and the water outlet portion 612 by the rotation of the shaft 90, the water which flows into and flows out is prevented from leaking between the shaft 90 and the head 60. In particular, the shape of the sealing member 94 may be formed to be lengthened in a direction in which the shaft 90 is rotated so that the removal of the sealing member 94 from the shaft 90 or interference of the sealing member 94 with the shaft 90 is minimized during the rotation of the shaft 90.

A sealing rib 613 may be formed in a water inlet port 611a and a water outlet port 612a which are formed in the water inlet portion 611 and the water outlet portion 612, respectively. The sealing ribs 613 prevent the sealing member 94 from being separated or damaged and may be formed to cross the water inlet port 611a and the water outlet port 612a of the inner surface of the upper body 64. The sealing ribs 613 may extend laterally and a plurality of sealing ribs 613 may be disposed in a direction intersecting each other, if necessary.

Therefore, the sealing member 94 which is passed by the water inlet port 611a and the water outlet port 612a which are formed in the water inlet portion 611 and the water outlet portion 612 is hooked into the water inlet port 611a and the water outlet port 612a in a process of the rotation of the shaft 90 and thus the sealing member 94 is capable of being prevented from being separated from the sealing member mounting portion 911. In other words, since a state where the sealing ribs 613 press the outer surface of the sealing member 94 in the process of the rotation of the shaft 90 is maintained, the sealing member 94 is capable of being prevented from being separated from the sealing member mounting portion 911.

A bypass inlet port 951 and a bypass outlet port 952 may be formed between the shaft inlet port 961 and the shaft outlet port 962 of the outer surface of the upper part 91, respectively. The bypass inlet port 951 and the bypass outlet port 952 may also be disposed at positions facing each other. Accordingly, in a case where the bypass inlet port 951 and the bypass outlet port 952 are aligned with the water inlet portion 611 and the water outlet portion 612 by the rotation of the shaft 90, the water supplied to the water inlet portion 611 is capable of being discharged directly to the water outlet portion 612 through the bypass flow path 95.

The bypass inlet port 951 and the bypass outlet port 952 may be formed at positions which are the same height as the shaft inlet port 961 and the shaft outlet port 962, respectively and which are rotated by 90 degrees to each other. Therefore, in order to connect the filtering flow path 96 or the bypass flow path 95 to the water inlet portion 611 and the water outlet portion 612, the shaft 90 should be rotated by 90 degrees.

A portion which forms the upper end of the filtering flow path 96 is capable of projecting from the bypass flow path 95 in the inside of the upper part 91. Accordingly, it is possible to realize the filtering flow path 96 and the bypass flow path 95 at the same time in a state where the height of the shaft 90 is minimized. Through this, the head 60 and the water purifying apparatus 17 is capable of being configured more compactly.

A rotating projection 921 may be provided on the lower surface of the upper part 91. A pair of rotating projections may be formed and one rotating projection may be formed at a position corresponding to the shaft inlet port 961 and the shaft outlet port 962, respectively. In other words, the pair of rotating projections 921 may be formed at positions which are rotated by 90 degrees with respect to each other.

On the other hand, the lower part 92 extends from the center of the upper part 91 in the lower direction. The lower part 92 may be formed to be smaller than the inner diameter of the seating portion 65 and extend through the seating portion 65 in the lower direction. The lower part 92 may extend to a length such that the shaft 90 and the upper supporter 80 are capable of being engaged with each other when the filter 40 is coupled to the head 60.

A water outlet guide portion 965b may be formed on one side surface of the lower part 92. The water outlet guide portion 965b may extend vertically from the lower side of the shaft outlet port 962. The water outlet guide portion 965b may be formed by cutting a portion of the outer surface of the lower part 92 having a cylindrical shape into a planar shape, for example.

Therefore, in a state where the shaft 90 is mounted on the head 60, the water outlet guide portion 965b of the shaft 90 is spaced apart from the inner surface of the head 60 and thus the shaft water outflow path 965 which is a flow path of water is formed. Since the lower end of the water outlet guide portion 965b is located on the upper side of the filter outlet port 862, the water discharged from the filter outlet port 862 is moved along the water outlet guide portion 965b in the upper direction, and then passes by the shaft outlet port 962 and the water outlet portion 612 in this order and flows to the water outlet pipe 302.

Figure 12:
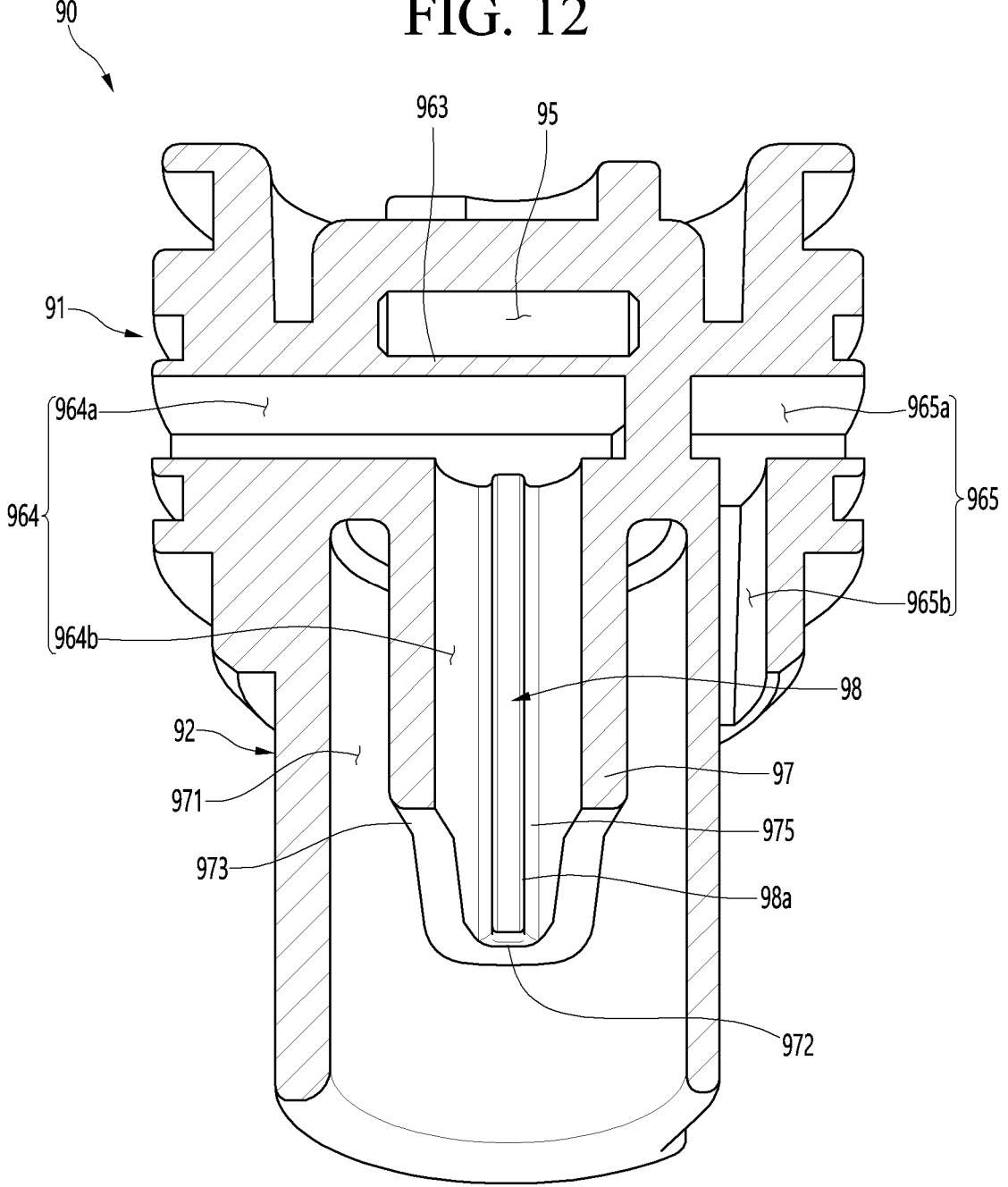
FIG. 12 is a cross-sectional view illustrating an internal structure of the shaft viewed from one side.
Figure 13:
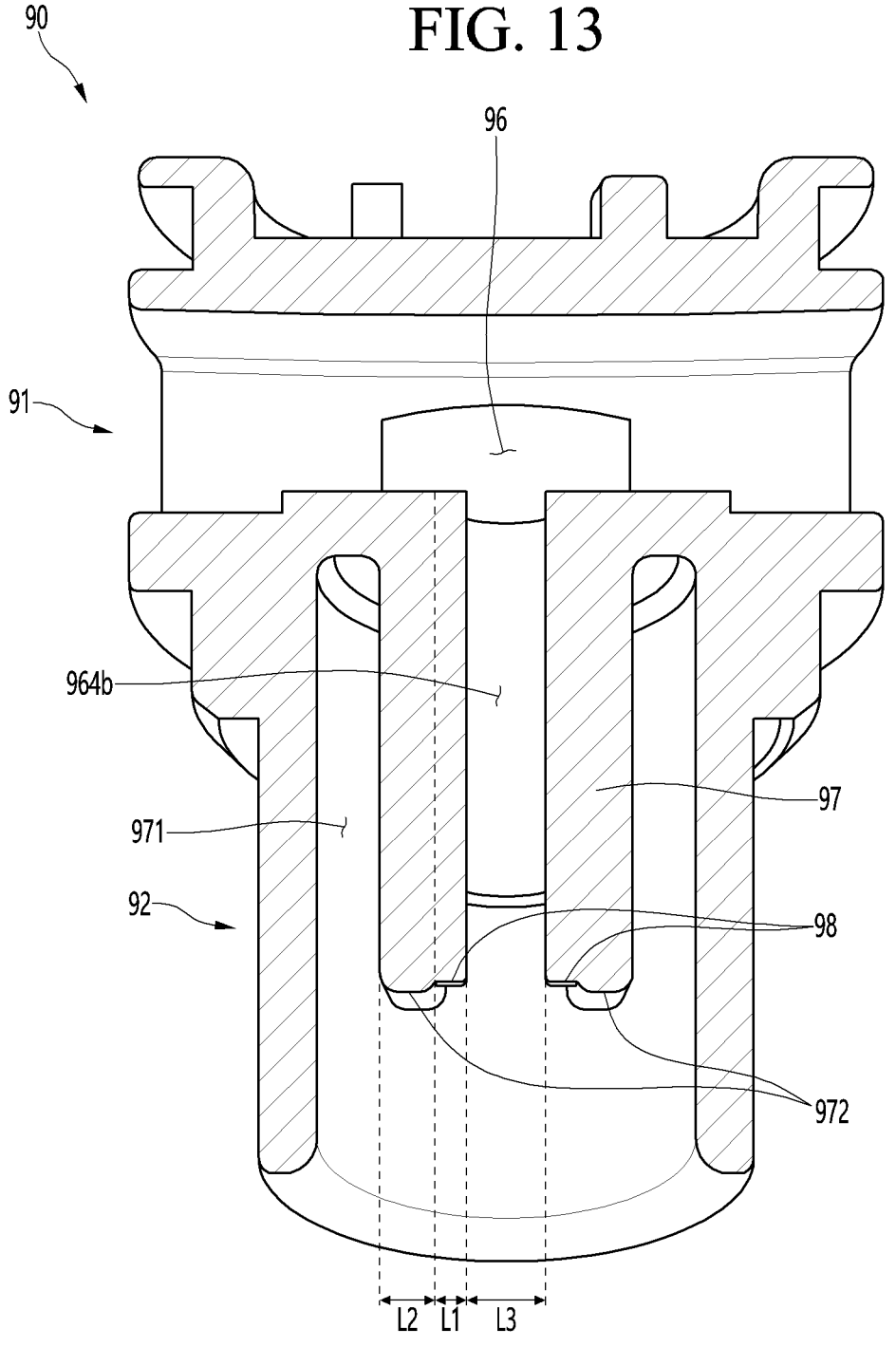
FIG. 13 is a cross-sectional view illustrating an inner structure of the shaft viewed from the other side.
Figure 14:
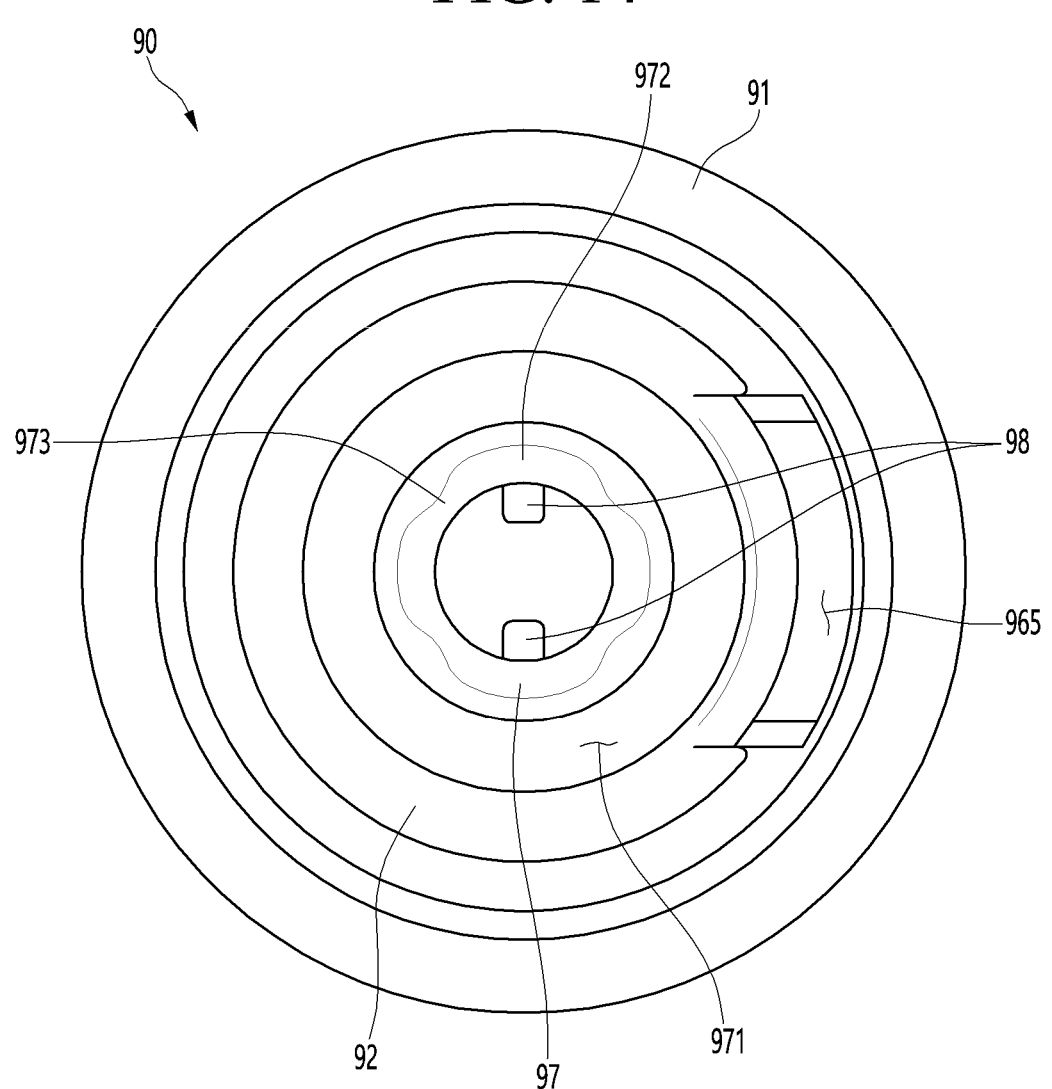
FIG. 14 is a cross-sectional view illustrating the shaft viewed from the lower side.

FIG. 12 is a cross-sectional view illustrating an internal structure of the shaft viewed from one side. FIG. 13 is a cross-sectional view illustrating an internal structure of the shaft viewed from the other side. FIG. 14 is a cross-sectional view illustrating the shaft viewed from the lower side.

The structure of the shaft 90 will be described in more detail with reference to the drawings. The shaft 90 may be inserted through the opened upper surface of the head body 61 and thus may be disposed in the inside of the head 60.

A filtering flow path 96 and a bypass flow path 95 are formed in the shaft 90. The filtering flow path 96 or the bypass flow path 95 may be selectively connected to the water inlet portion 611 and the water outlet portion 612 by the rotation of the shaft 90.

The shaft 90 may include an upper part 91 and a lower part 92. The shaft 90 may be made of a plastic material.

Inside the upper part 91, the upper end of the filtering flow path 96 and the bypass flow path 95 may be formed. In detail, a shaft inlet port 961 through which water is introduced into the inner space of the shaft 90 is formed around the upper part 91 at a position corresponding to the water inlet portion 611.

A shaft outlet port 962 through which water in the inner space of the shaft 90 is discharged may be formed at a position corresponding to the water outlet portion 612. A bypass inlet port 951 and a bypass outlet port 952 may be formed between the shaft inlet port 961 and the shaft outlet port 962 of the outer surface of the upper part 91, respectively.

Accordingly, the shaft inlet port 961 and the shaft outlet port 962 may be aligned with the water inlet portion 611 and the water outlet portion 612 by the rotation of the shaft 90, respectively. Water supplied to the water inlet portion 611 may pass through the filtering flow path 96 and pass through the filter 40, and then purified water may be discharged to the water outlet portion 612.

The bypass inlet port 951 and the bypass outlet port 952 may be aligned with the water inlet portion 611 and the water outlet portion 612 by the rotation of the shaft 90, respectively. Water supplied to the water inlet portion 611 may pass through the bypass flow path 95 and may be directly discharged to the water outlet portion 612.

On the other hand, the lower part 92 may be formed to extend downward from the center of the upper part 91. An inner pipe 97 is formed inside the lower part 92.

The inner pipe 97 may be connected to one end of the filter. More specifically, the inner pipe 97 may be connected to the supporter extending portion 85. Accordingly, water which flows in through the shaft 90 may be supplied to the filter 40 through the upper supporter 80. The inner pipe 97 may form a vertical portion 964b of the filtering flow path 96.

The outer surface of the inner pipe 97 may be disposed to be separated from the inner surface of the lower part 92 to form a space 971. Accordingly, when the filter 40 is mounted, the upper end of the supporter extending portion 85 may be inserted into the space 971.

The second connecting portion 972 to which the first connecting portion 851 formed at the upper end of the supporter extending portion 85 is coupled may be formed at the lower end of the inner pipe 97. A pair of second connecting portions 972 may be formed in the same shape at positions facing each other.

In a state where the second connecting portion 972 is coupled to the first connecting portion 851, the shaft 90 may also rotate by the rotation of the filter 40.

The filtering flow path 96 or the bypass flow path 95 may be selectively switched.

A pair of pipe cutout portions 973 may be included between the pair of second connecting portions 972. When the shaft 90 and the supporter extending portion 85 are completely assembled with each other, the pipe cutout portion 973 may be assembled with the projecting portion 852.

Second inclined surfaces 974 are formed on both side ends of the pair of second connecting portions 972. When the filter 40 is further rotated in a state where the rotation of the shaft 90 is restricted by the stopper 652, a force in the rotating direction is applied to the second inclined surface 974. Therefore, the filter 40 may be easily separated.

A reinforcing portion 98 projecting from the inner surface and extending upward from the lower end of the inner pipe 97 may be included on the inner surface of the inner pipe 97, that is, the filtering flow path.

The reinforcing portion 98 may be formed to extend in a vertical direction from the inner surface of the inner pipe 97. For example, the reinforcing portion 98 may be formed to extend from the upper end to the lower end of the inner pipe 97. The reinforcing portion 98 may reinforce the strength of the inner pipe 97 more firmly.

The lower end of the reinforcing portion 98 may be located in the area of the second connecting portion 972. In other words, the reinforcing portion 98 may be formed at a position corresponding to the second connecting portion 972 on the inner surface of the inner pipe 97. A pair of reinforcing portions 98 may be formed between the pipe cutout portions 973.

In detail, the lower end of the reinforcing portion 98 may be formed at a position corresponding to the lower end of the second connecting portion 972. The lower end of the reinforcing portion 98 may be located below the lower end of the pipe cutout portion 973.

The reinforcing portion 98 may be formed to project inward from the inner surface of the inner pipe 97. That is, the reinforcing portion 98 may be formed on the vertical portion 964b of the filtering flow path 96.

With this structure, it is possible to prevent the inner pipe 97 from being damaged or deformed while the shaft 90 and the supporter extending portion 85 are separated or mounted by rotation.

In detail, the shaft 90 is separated from or assembled with the supporter extending portion 85 by the force rotated in the process of inserting the filter 40 into the head 60. At this time, the end of the inner pipe 97 may be damaged and deformed due to friction and rotational force in the process of assembling or separating the projecting portion 852 of the supporter extending portion 85 and the first connecting portion 851.

In particular, a user who is inexperienced in replacing or removing the filter 40 may not recognize whether the rotation of the shaft 90 is restricted by the stopper 652. In this case, the process of mounting the filter 40 on the head 60 may be repeated by rotating the filter in a direction opposite to the rotating direction for separating the filter 40 from the head 60.

In addition, since the user is mistaken by the stopper 652 and does not recognize that the filter 40 and the shaft 90 are fully assembled, and the user may apply a greater force to rotate the filter 40.

In this case, a torsional moment is repeatedly applied to the first inclined surface 853 and the second inclined surface 974, or a greater force is applied than necessary. Thus, the end of the inner pipe 97 may be damaged or deformed by the flow of the projecting portion 852.

The reinforcing portion 98 may reinforce the strength of the inner pipe 97 to prevent the inner pipe 97 from being damaged or deformed in the process of replacing the filter 40.

The reinforcing portion 98 may be formed to project inward from the inner surface of the inner pipe 97 at a position corresponding to the second connecting portion 972. The second connecting portion 972 projects most downward from the inner pipe 97 and is likely to be damaged or deformed by an external force. By arranging the lower end portion of the reinforcing portion 98 at a position corresponding to the second connecting portion 972, the strength of the second connecting portion 972 may be made more robust.

In addition, when the filter 40 is inserted into the head 60 by a predetermined depth, the second connecting portion 972 is inserted into the first connecting portion 851. The filter 40 may be rotated and inserted into the head 60 to be completely mounted. In this case, the second connecting portion 972 is maintained in a state of being inserted into the first connecting portion 851.

The reinforcing portion 98 may prevent the second connecting portion 972 from being deformed by the pressure of the first connecting portion 851.

With this structure, it is possible to prevent the lower end of the inner pipe 97 from being deformed by repetitive replacement of the filter 40. Therefore, due to the reinforcing portion, the shaft 90 can be used for a long time.

The reinforcing portion 98 may extend downward from the upper end of the inner pipe 97 in a vertical direction. That is, the upper end of the reinforcing portion 98 may be formed at a position corresponding to the upper end of the inner pipe 97.

The upper end of the reinforcing portion 98 is located at the upper end of the inner pipe 97. The water flowing through the filtering flow path 96 may be guided to the inside of the filter 40 and the flow rate may be increased.

A shaft water inlet flow path 964 forming the filtering flow path 96 has a horizontal portion 964a extending from the shaft inlet port 961 to the center of the shaft 90. The shaft water inlet flow path 964 has a vertical portion 964b extending downward from the end portion of the horizontal portion 964a.

That is, the water flowing into the horizontal portion 964a through the shaft inlet port 961 changes the flow path while flowing into the vertical portion 964b. Water flowing into the vertical portion 964b has a rotational force due to the change in the flow path. Water flowing into the vertical portion 964b rotates and flows along the inner circumferential surface of the vertical portion 964b, so that the rate of flowing into the filter inlet flow path 871 may be slowed down.

That is, the upper end of the reinforcing portion 98 may be formed at a position corresponding to the upper end of the inner pipe 97. In the process of changing the flow path from the horizontal portion 964a to the vertical portion 964b, the reinforcing portion 98 may guide the flow along one side of the inner pipe 97. That is, the reinforcing portion 98 may guide water to flow along the inner surface of the inner pipe 97 in a direction close to the shaft inlet port 961.

Accordingly, water flowing into the inner pipe 97 may smoothly and quickly flow into the filter 40. Accordingly, there is an advantage of preventing the water flowing from the shaft inlet port 961 to the horizontal portion 964a from flowing back into the vertical portion 964b.

The lower end of the reinforcing portion 98 may be located below the lower end of the pipe cutout portion 973. In detail, the lower end of the reinforcing portion 98 may extend to the lower end of the second connecting portion 972.

The lower end of the reinforcing portion 98 may be located below the upper end of the pipe cutout portion 973. With this structure, the strength of the second connecting portion 972 is made more robust and water flowing from the horizontal portion 964*a* to the vertical portion 964*b* may be guided to the lower end of the vertical portion 964*b*.

On the other hand, the inner pipe 97 may further include an inclined portion 975 inclined to connect from the inner surface to both side ends of the reinforcing portion 98.

The inclined portion 975 has a structure inclined in a direction closer to the center of the inner pipe 97 as it extends from the inner surface of the inner pipe 97 to one end of the reinforcing portion 98.

The inclined portion 975 strengthens the strength of the inner pipe 97 together with the reinforcing portion 98 and allows water flowing into the vertical portion 964*b* to flow smoothly.

A round portion 98*a* in which a round is formed may be further provided at a corner of the reinforcing portion 98. The round portion 98*a* may be formed on both side ends of the reinforcing portion 98. As such, when the round portion 98*a* is provided, even if the first connecting portion 851 contacts the second connecting portion 972, an instantaneous impact caused by the contact may be buffered. Therefore, it is possible to prevent damage to the first connecting portion 851 or the second connecting portion 972.

The reinforcing portion 98 is formed by projecting from the inner surface of the inner pipe 97 in the direction of the center of rotation of the inner pipe 97. The length of the reinforcing portion 98 projecting from the inner surface of the inner pipe 97 may be shorter than the thickness of the inner pipe 97.

The reinforcing portion 98 is integrally formed with the inner pipe 97, so that the reinforcing portion 98 may be simply formed during injection molding of the shaft 90.

In detail, the length L1 in the horizontal direction in which the reinforcing portion 98 projects from the inner pipe 97 in the direction of the center of rotation may be shorter than the length L2 of the cross-section of the inner pipe 97 in the horizontal direction.

In other words, the length L1 from the inner surface of the inner pipe 97 to the projecting end portion of the reinforcing portion 98 may be less than the length L2 from the outer surface to the inner surface of the inner pipe 97.

The thickness of the reinforcing portion 98 is less than the thickness of the cross-section of the inner pipe 97. It is possible to facilitate the flow of water flowing into the inner pipe 97 and to facilitate separation and coupling between the inner pipe 97 and the supporter extending portion 85.

The reinforcing portion 98 may be provided with a pair of reinforcing portions 98 symmetrically with respect to the center of rotation of the inner pipe 97 on the inner surface of the inner pipe 97.

In this case, the distance L3 between the pair of reinforcing portions 98 may be longer than the length L1 of the reinforcing portion 98 in the horizontal direction projecting from the inner pipe 97.

The distance L3 between the pair of reinforcing portions 98 may be longer than the length L2 of the cross-section of the inner pipe 97 in the horizontal direction.

In other words, in the reinforcing portion 98, the distance L3 between the pair of reinforcing portions 98 formed symmetrically on the inner surface of the inner pipe and facing each other may be longer than the distance L2 from the inner surface of the inner pipe to the projecting end portion of the reinforcing portion.

With this structure, there is an advantage of allowing water to smoothly flow into the inner pipe 97.

In addition, the distance L3 between the pair of reinforcing portions 98 spaced apart from each other may be equal to or greater than the sum of the length L1 of the reinforcing portion 98 projecting from the inner pipe 97 and the length of the cross-section of the inner pipe 97 in the horizontal direction L2. With this structure, it is possible to prevent the end portion of the inner pipe 97 from being damaged or deformed due to the contact of the supporter extending portion 85 during the rotation for separation and coupling of the supporter extending portion 85.

Figure 15:
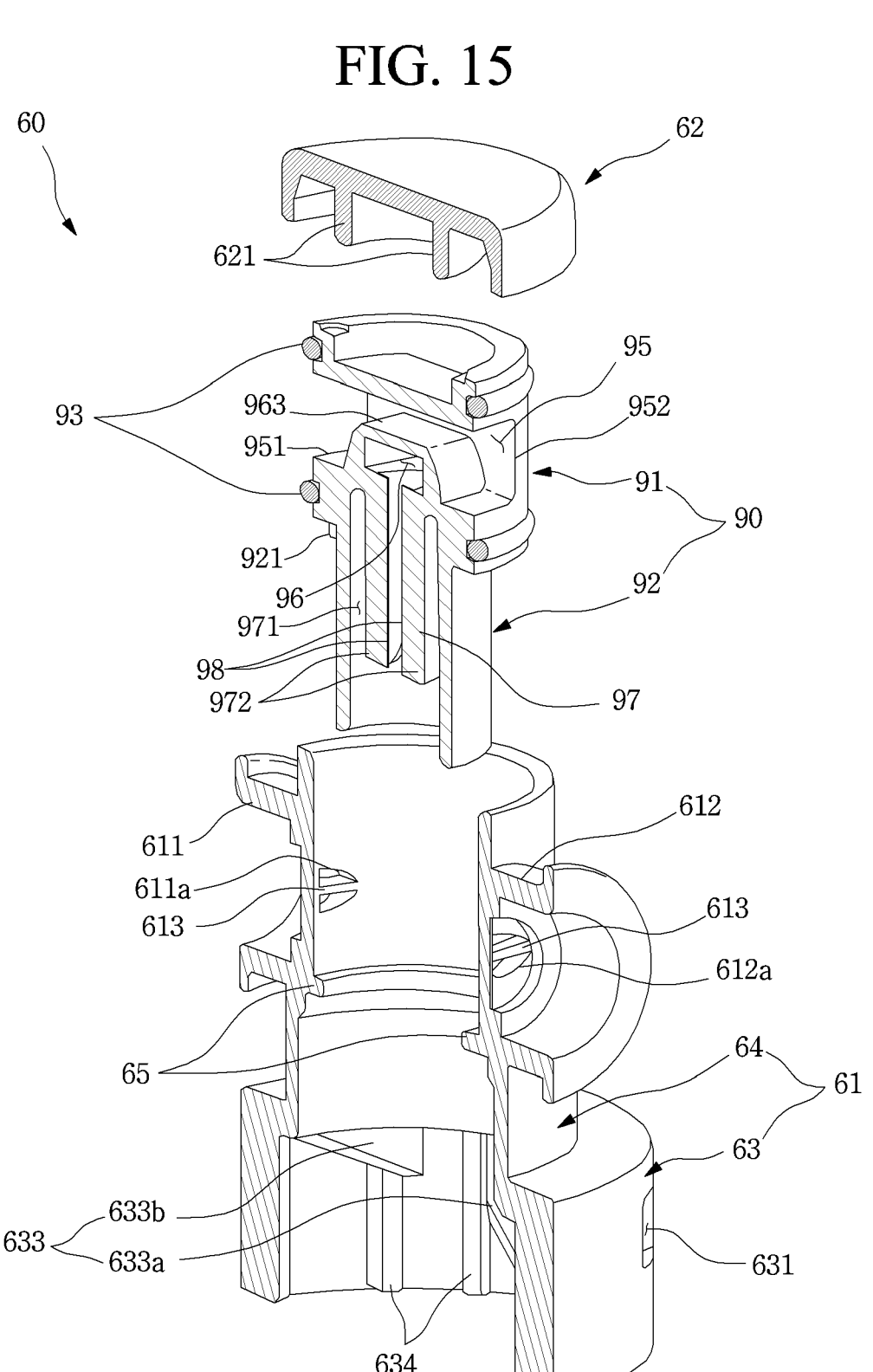
FIG. 15 is a cutaway exploded perspective view illustrating an internal structure of the head viewed from one side.
Figure 16:
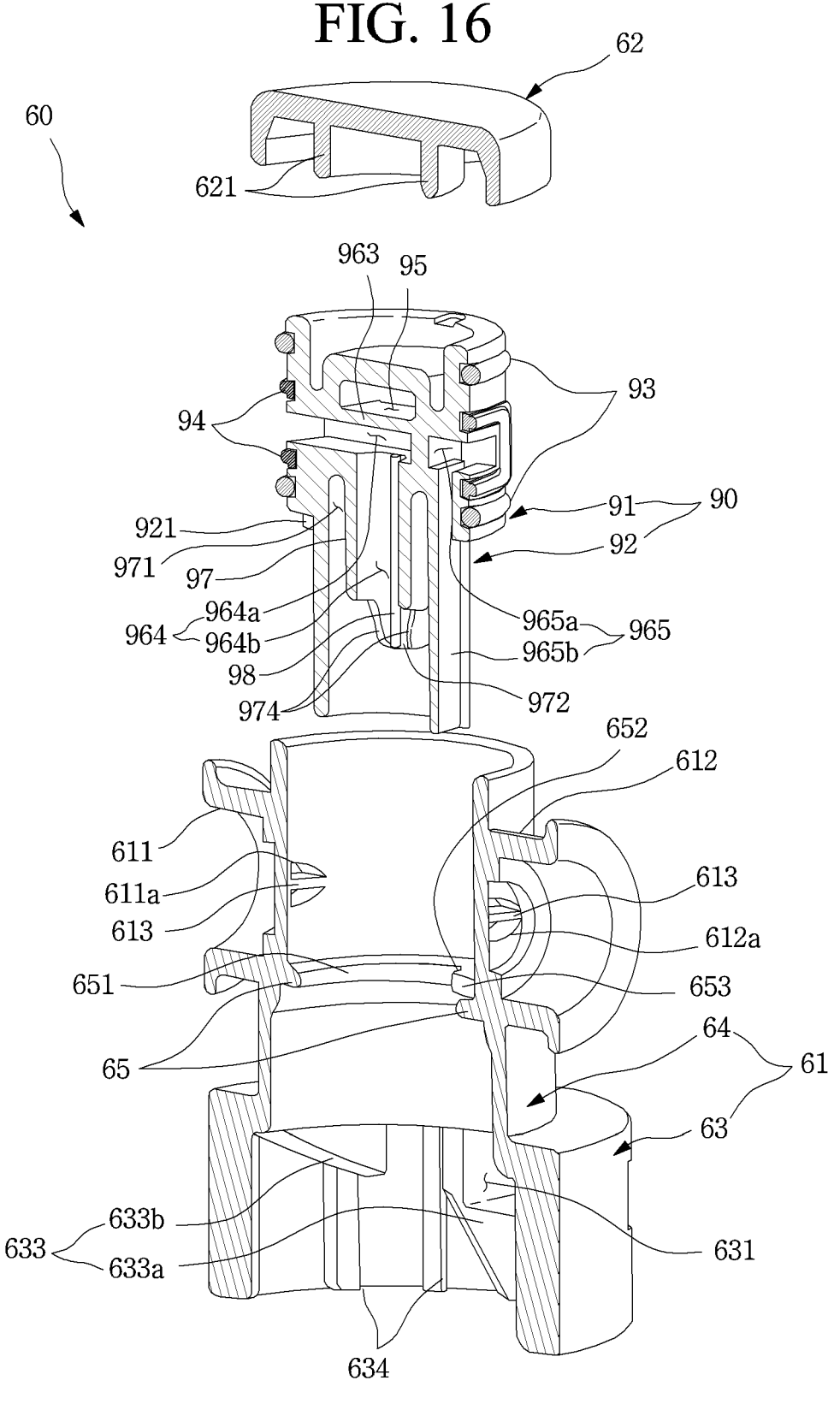
FIG. 16 is an exploded perspective view illustrating the coupling structure of the head viewed from the other side.

FIG. 15 is a cutaway exploded perspective view illustrating an internal structure of the head viewed from one side. FIG. 16 is an exploded perspective view illustrating the coupling structure of the head viewed from the other side.

FIG. 15 illustrates a longitudinal section in a state where the bypass flow path 95 is switched to be connected to the water inlet portion 611 and the water outlet portion 612. As illustrated in the drawing, a bypass flow path 95 passing through the center of the upper part 91 is formed on the upper part 91 and the bypass inlet port 951 and the bypass outlet port 952 are formed on both sides of the circumference of the upper part 91, respectively.

The bypass inlet port 951 and the bypass outlet port 952 may be formed to be larger than the sizes of the water inlet port 611*a* and the water outlet port 612*a* and may be positioned between a pair of shaft O-rings which are vertically disposed. Therefore, the water passing through the bypass flow path 95 in a state where the bypass flow path 95 is aligned with the water inlet portion 611 and the water outlet portion 612 does not leak to the outside and is passed across the head 60.

In other words, water introducing into the head 60 passes through the head 60 without passing through the filter 40, and even in a state where the filter 40 is separated, water does not leak from a side on which the filter 40 is mounted and is capable of being continuously supplied to the water supplying flow path 30.

On the other hand, a flow path projecting portion 963 which projects for forming the filtering flow path 96 to be described below is formed on the inner surface of the bypass flow path 95. The flow path projecting portion 963 may be formed at the center of the inside portion of the shaft 90 and project from the bottom of the bypass flow path 95 but may be formed not to shield the bypass flow path 95.

Both ends of the flow path projecting portion 963 are formed to be inclined or rounded so that decrease in the flow velocity caused by the flow path projecting portion 963 is capable of being minimized when water flows through the bypass flow path 95.

FIG. 16 illustrates a longitudinal section in a state where the filtering flow path is shifted to be connected with the water inlet portion and the water outlet portion.

As illustrated in the drawings, the filtering flow path 96 may be connected to the water inlet portion 611 and the water outlet portion 612 according to the rotation of the shaft 90.

At this time, the shaft inlet port 961 and the shaft outlet port 962 are in contact with the water inlet port 611*a* and the water outlet port 612*a*, respectively and the outsides of the shaft inlet port 961 and the shaft outlet port 962 and the outsides of the water inlet port 611*a* and the water outlet port 612*a* are capable of being fully sealed by the sealing member 94. An inner pipe 97 is formed on the inside of the lower part 92 and the inner pipe 97 is capable of being connected to the supporter extending portion 85.

Accordingly, the water which flows into through the shaft 90 is capable of being supplied to the inside portion of the filter 40 through the upper supporter 80 and discharged to the shaft 90 through the upper supporter 80 after the water is purified by the filtering member 44. In other words, the water which flows into the head 60 is capable of being purified through the filter 40 and then discharged through the head 60.

On the other hand, the filtering flow path 96 may include a shaft water inlet flow path 964 and a shaft water outlet flow path 965.

The shaft water inlet flow path 964 includes a horizontal portion 964*a* which extends from the shaft inlet port 961 to the center of the shaft 90 and a vertical portion 964*b* which extends from an end portion of the vertical portion 964*a* in the lower direction. The vertical portion 964*b* may be formed by the inner pipe 97.

The outer surface of the inner pipe 97 is disposed to be spaced apart from the inner surface of the lower part 92 to form a spacing space 971. The distance of the spacing space 971 may be formed to correspond to the thickness of the supporter extending portion 85. Therefore, when the filter 40 is mounted, the upper end of the supporter extending portion 85 is capable of being inserted into an inside of the spacing space 971.

The length of the inner pipe 97 in the vertical direction is formed to be shorter than that of the outer surface of the lower part 92 in the vertical direction. The inner pipe 97 and the supporter extending portion 85 may be connected to each other on the inner surface of the lower part 92. To this end, a second connecting portion 972 may be formed on the lower end of the inner pipe 97.

The second connecting portion 972 may be formed in a shape corresponding to the first connecting portion 851. The second connecting portion 972 is inserted into the first connecting portion 851 so that the shaft 90 and the upper supporter 80 are capable of being rotated together.

The shaft water inlet flow path 964 is capable of communicating with the filter inlet flow path 871 and the water for purification is capable of being supplied to the filtering member 44 by the coupling between the inner pipe 97 and the supporter extending portion 85 with each other.

The shaft water outlet flow path 965 may include an water outlet guide portion 965*b* which is formed on an outer surface of the lower part 92 and an water outlet connecting portion 965*a* which is formed on the upper part 91.

The upper end of the water outlet guide portion 965*b* passes through the lower surface of the upper part 91 and then communicates with the water outlet connecting portion 965*a*. The water outlet connecting portion 965*a* connects the water outlet guide portion 965*b* and the shaft outlet port 962 at the inside of the upper part 91.

Accordingly, the purified water which is discharged from the filter outlet port 862 is capable of being moved along the water guide portion 965*b* in the upper direction and discharged to the shaft outlet port 962 through the water outlet connecting portion 965*a*. The purified water which is discharged to the shaft outlet port 962 may be discharged through the water outlet portion 612.

Accordingly, as illustrated in FIG. 16, in a state where the filtering flow path 96 is connected to the water inlet portion 611 and the water outlet portion 612, the water which flows into the head 60 through the water inlet pipe 301 is supplied into the inside portion of the filter 40 and then is capable of being purified, and may flows again from the filter 40 to the head 60 and may be discharged to the water outlet pipe 302.

On the other hand, the body seating portion 65 may be formed on the inner circumferential surface of the upper body 64. The lower surface of the upper part 91 is seated on the body seating portion 65 when the shaft 90 is mounted.

Figure 17:
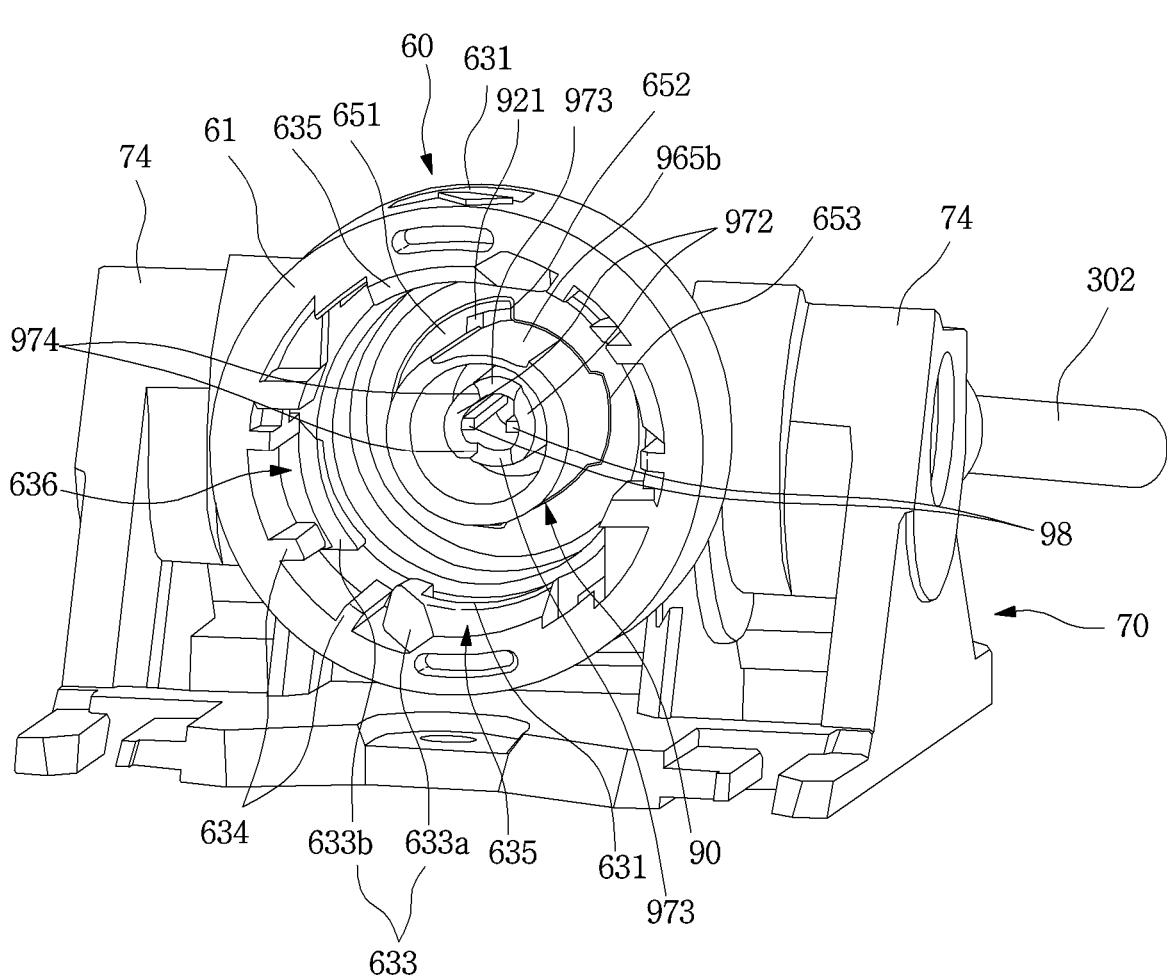
FIG. 17 is a perspective view illustrating the head viewed from the lower side.
Figure 18:
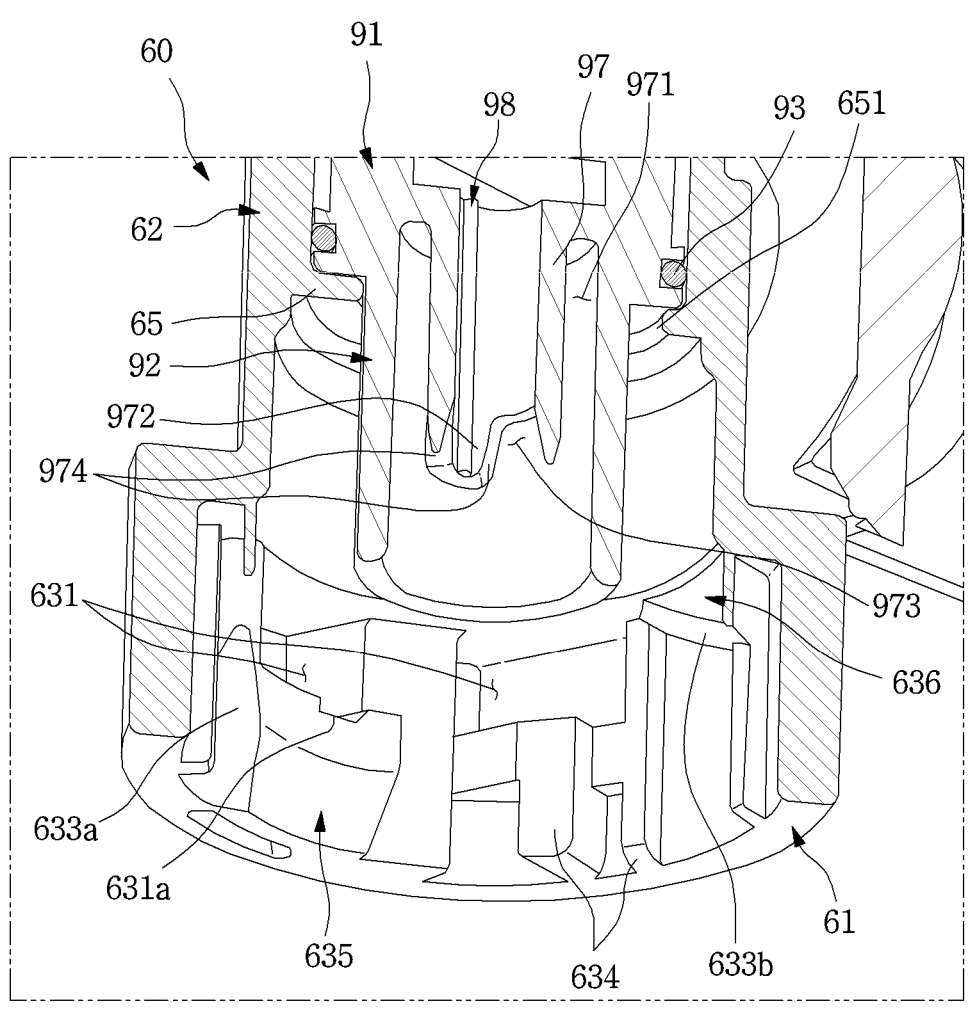
FIG. 18 is a partially cutaway perspective view illustrating the head.

FIG. 17 is a perspective view illustrating the head viewed from the lower side. FIG. 18 is a partially cutaway perspective view illustrating the head.

With reference to FIG. 15 to FIG. 18, a rotating guide 651 is formed on the body seating portion 65 by being cut. At this time, the rotating projection 921 is positioned on an inside of the rotating guide 651. The rotating guide 651 may be cut by an angle of 180 degrees with respect to the center of the head body 61. However, it is limited thereto.

Since a pair of rotating projections 921 are disposed at an angle of 90 degrees, in a case where the shaft 90 may be rotated by the angle of 90 degrees, the rotating projections 921 is capable of being stopped by stoppers 652 which are formed on both ends of the rotating guide 651.

The water inlet portion 611 and the water outlet portion 612 may be selectively connected to the filtering flow path 96 or the bypass flow path 95 at a position which is stopped by the stopper 652. Therefore, when the user rotates the filter 40 to a point where the filter 40 is no longer rotated in one direction even without rotating the filter 40 while measuring an accurate angle, the flow path is capable of being selected and accurately connected.

A flow path cutout portion 653 may be formed on one side of the body seating portion 65. The flow path cutout portion 653 may be formed on the seating portion 65 in a position facing the rotating guide 651 and may be formed on the lower side of the water outlet port 612*a* in the vertical direction.

Therefore, the flow path cutout portion 653 is positioned on a position which is the same as that of the water outlet guide portion 965*b* in a state where the shaft 90 is rotated so that the filtering flow path 96 is connected to the water inlet portion 611 and the water outlet portion 612. The flow path cutout portion 653 may be formed to have the same width as the water outlet guide portion 965*b*. Therefore, the water outlet guide portion 965*b* and the flow path cutout portion 653 are capable of being in contact with each other to form a flow path through which the purified water is capable of flowing in the upper direction.

On the other hand, a pair of the coupling grooves 631 and a plurality of the supporting ribs 634 may be formed on the inner surface of the lower body 63. When the filter 40 is mounted on the head 60 and then rotated so that the filtering flow path 96 is connected to the water inlet portion 611 and the water outlet portion 612, the coupling projection 433 is capable of being inserted into the coupling groove 631.

The coupling groove 631 may be exposed to the outside portion through the opening portion 632 and the coupling state of the restraining projection 433*b* and the restraining groove 631*a* is capable of being checked through the opening portion 632. The position of the restraining groove 631*a* may be formed at a position in which the restraining projection 433*b* and the restraining groove 631*a* may be engaged to be restrained with each other in a state where the coupling projection 433 is fully rotated. Therefore, in a state where the filter 40 is inserted into the inside of the head 60 and then fully rotated, the coupling projection 433 is capable of being restrained in the inside of the coupling groove 631 and thus random separation of the filter is capable of being prevented.

On the other hand, the coupling groove 631 may be formed by a first guide projecting portion 635 which projects from the inner surface of the lower body 63. The restraining groove 631*a* may be formed on the upper surface of the first guide projecting portion 635. The first guide projecting portion 635 may be formed from the opened end of the lower body 63 to the coupling groove 631 and provides a surface on which the coupling projection 433 is capable of being seated.

Therefore, when the filter 40 is inserted into the head 60, the coupling projection 433 is not capable of being inserted into some sections of the opening of the lower surface of the head 60 due to the interference of the first guide projecting portion 635. The coupling projection 433 is capable of being inserted through the section which is not interfered with the first guide projecting portion 635, so that the filter 40 is capable of being prevented from being erroneously mounted.

A first groove guide portion 633*a* for guiding the coupling projection 433 to the entrance of the adjacent coupling groove 631 may be formed on one side surface of the first guide projecting portion 635. The first groove guide portion 633*a* may be formed to have a predetermined inclination and is in contact with the projection guide portion 433*a* of the coupling projection 433 and thus guides the rotational movement of the coupling projection 433 in one direction when the coupling projection 433 is inserted.

A second guide projecting portion 636 may be formed on one side which is spaced apart from the end portion of the first groove guide portion 633*a* along the inner surface of the lower body 63 by a predetermined distance. A second groove guide portion 633*b* is formed to be inclined on the second guide projecting portion 636 so that the coupling projection 433 which passes by the first groove guide portion 633*a* rotates moves along the second groove guide portion 633*b* so as to be guided and to be moved the entrance of the coupling groove 631. The second groove guide portion 633*b* may extend from one side away from the first groove guide portion 633*a* to the entrance of the coupling groove 631.

Therefore, when the filter 40 is inserted into the opened lower surface of the lower body 63 after the coupling projection 433 is positioned at a position corresponding to the inserting display portion 613 when the filter 40 is mounted, the projection guide portion 433*a* slides along the first groove guide portion 633*a* and then is slid along the second groove guide portion 633*b* and inserted into the inside of the coupling groove 631.

In a case where the user inserts the coupling projection 433 of the filter 40 by aligning the coupling projection 433 in a process of the filter 40 being inserted into the inside of the head 60, the filter 40 is capable of being coupled while being smoothly rotated by the first groove guide portion 633*a* and the second groove guide portion 633*b*.

The shaft 90 and the upper supporter 80 are integrally coupled with each other in a state where the filter 40 is fully inserted and then the coupling projection 433 is positioned at the entrance of the coupling groove 631. Wren the filter 40 is further rotated so that the coupling projection 433 is fully inserted into the inside of the coupling groove 631, the shaft 90 is rotated together with the filter 40 and the filtering flow path 96 is rotated to be connected to the water inlet portion 611 and the water outlet portion 612.

To this end, a second connecting portion 972 may be formed at the lower end of the shaft 90, that is, at the lower end of the inner pipe 97. A pair of second connecting portions 972 may be formed in the same shape at a position which faces each other, and both sides of the lower end of the inner pipe 97 are formed by being cut. However, it is not limited to thereto.

Specifically, the lower end of the inner pipe 97 may include the pair of second connecting portions 972 and a pair of pipe cutout portions 973 formed between the second connecting portions 972. The pair of second connecting portions 972 may have a width which is gradually narrowed in the lower direction.

A second inclined surface 974 may be formed at both side ends of the pair of second connecting portions 972 and the second inclined surface 974 may be formed to have an inclination corresponding to the first inclined surface 853.

The second inclined surface 974 is inserted along the first inclined surface 853 in a process of the filter 40 being rotatably inserted into the head 60. When the filter 40 is fully inserted into the head 60, the second connecting portion 972 is matched with the first connecting portion 851 and the projecting portion 852 is matched with the pipe cutoff portion 973. Therefore, the first inclined surface 853 and the second inclined surface 974 are capable of being in close fully contact with each other.

In addition, the second inclined surface 974 may be also formed to be inclined in the direction of rotation of the filter 40 as the first inclined surface 853. Therefore, when the filter 40 is further rotated in a state where the rotation of the shaft 90 is restricted by the stopper 652, the force in the rotating direction is acted to the second inclined surface 974 and the first inclined surface 853 and the first inclined surface 853 moves along the second inclined surface 974 so that the filter 40 is capable of being easily separated.

On the other hand, a plurality of the supporting ribs 634 are formed on the inner surface of the lower body 63 and the outer surface of the filter inserting portion 431 is capable of being supported by the supporting ribs 634.

Hereinafter, the operation of the water purifying apparatus according to the embodiment of the present invention having the structure described above will be described.

Figure 19:
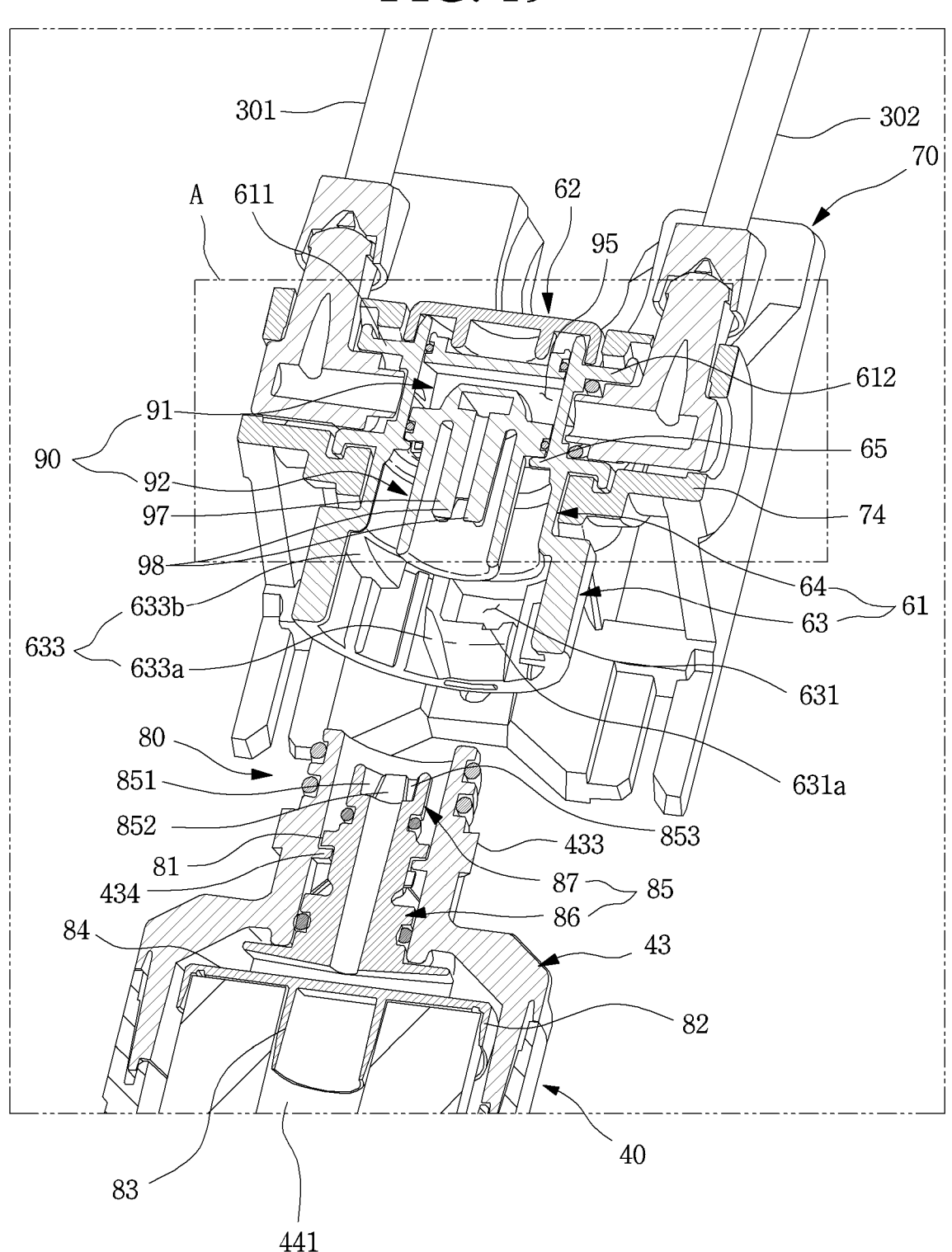
FIG. 19 is a cutaway perspective view illustrating a state where the filter and the head are separated from each other.
Figure 20:
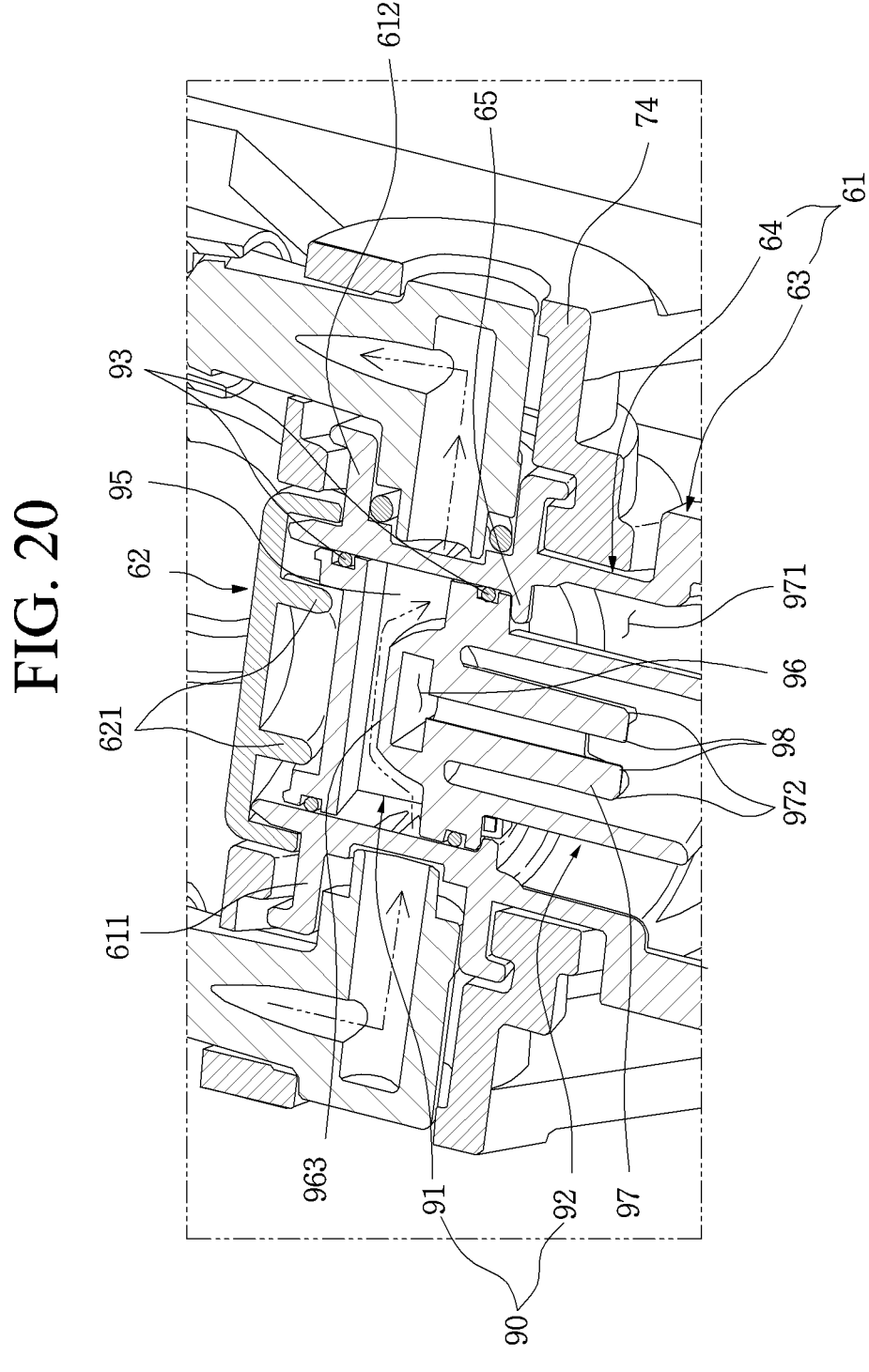
FIG. 20 is an enlarged view of portion A of FIG. 19.
Figure 21:
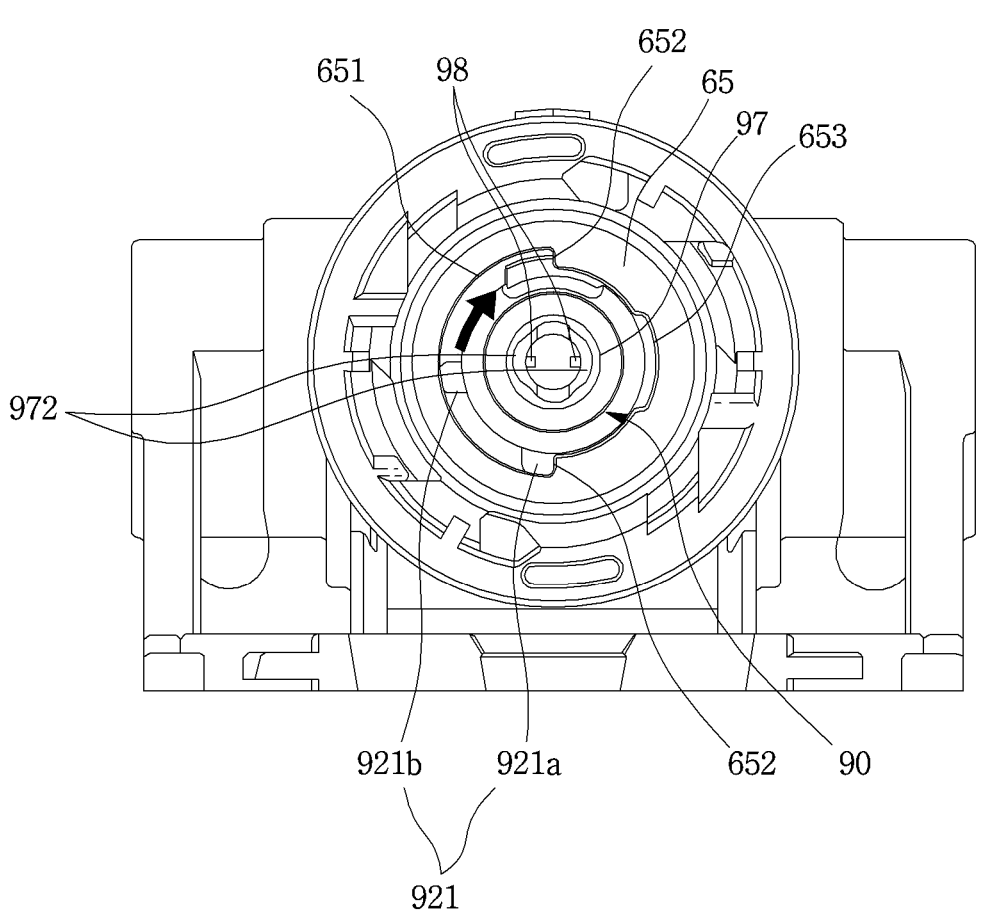
FIG. 21 is a view illustrating a shaft position in a state where the filter and the head are separated from each other.

FIG. 19 is a cutaway perspective view illustrating a state where of the filter and the head are separated from each other, FIG. 20 is an enlarged view of portion A of FIG. 19, and FIG. 21 is a view illustrating a shaft position in a state where the filter and the head are separated from each other.

As illustrated in the drawings, the bypass flow path 95 is connected to the water inlet portion 611 and the water outlet portion 612 in a state where the filter 40 is not coupled to the head 60.

Therefore, the water which flows into through the water inlet portion 611 flows into the bypass inlet port 951 through the water inlet port 611*a* and flows along the bypass flow path 95. The water is discharged to the water outlet portion 612 through the bypass outlet port 952 and the water outlet port 612*a*. In other words, the water which flows into the water inlet portion 611 passes through the head 60 without being subjected to a purification process, and is supplied directly to the ice maker 24 or the dispenser 23 through the water supplying flow path 30.

Such a state may correspond to a state where the filter 40 is separated for replacement of the filter 40, or may correspond to a case where the service which is related to the cleaning of a pipeline or other maintenance is performed. In addition, even in a case where at least a portion of the plurality of filters 40 are not used, or even in a case where purification of water is not required, it is capable of corresponding to such a state. Even in a case where the filter 40 is separated, no problem occurs in use of the refrigerator 1.

On the other hand, with reference to FIG. 21, when the disposition of the shaft 90 is described in a state where the filter 40 is not mounted, the first rotating projection 921a of the pair of rotating projections 921 is in a state of being in contact with the stopper 652 of one side of the rotating guide 651. In this state, the water outlet guide portion 965b and the flow path cutout portion 653 are maintained a state of being shifted by an angle of about 90 degrees with each other.

Figure 22:
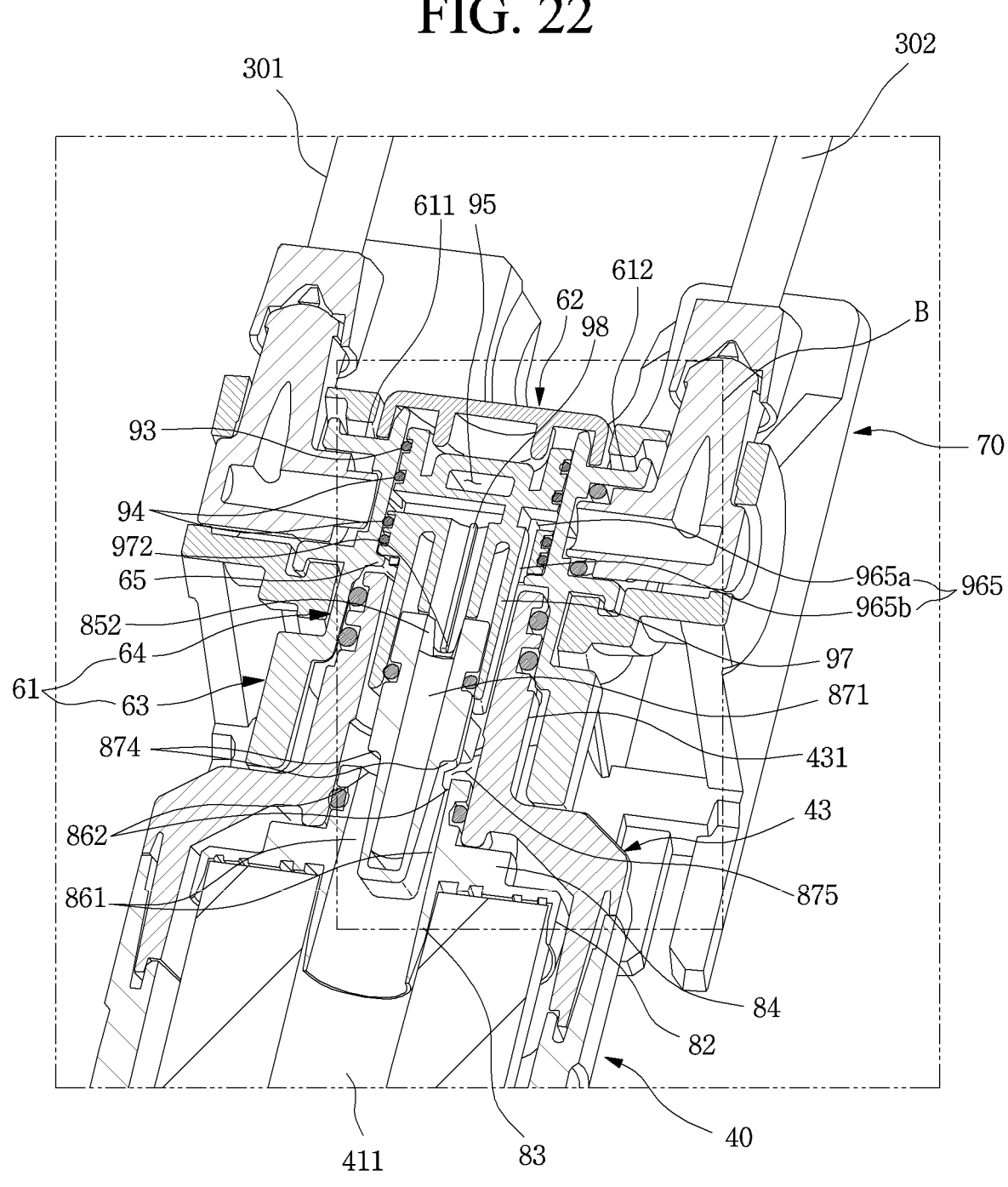
FIG. 22 is a view illustrating a state where the filter is rotated for coupling in a state where the filter is fully inserted into the inside of the head.
Figure 23:
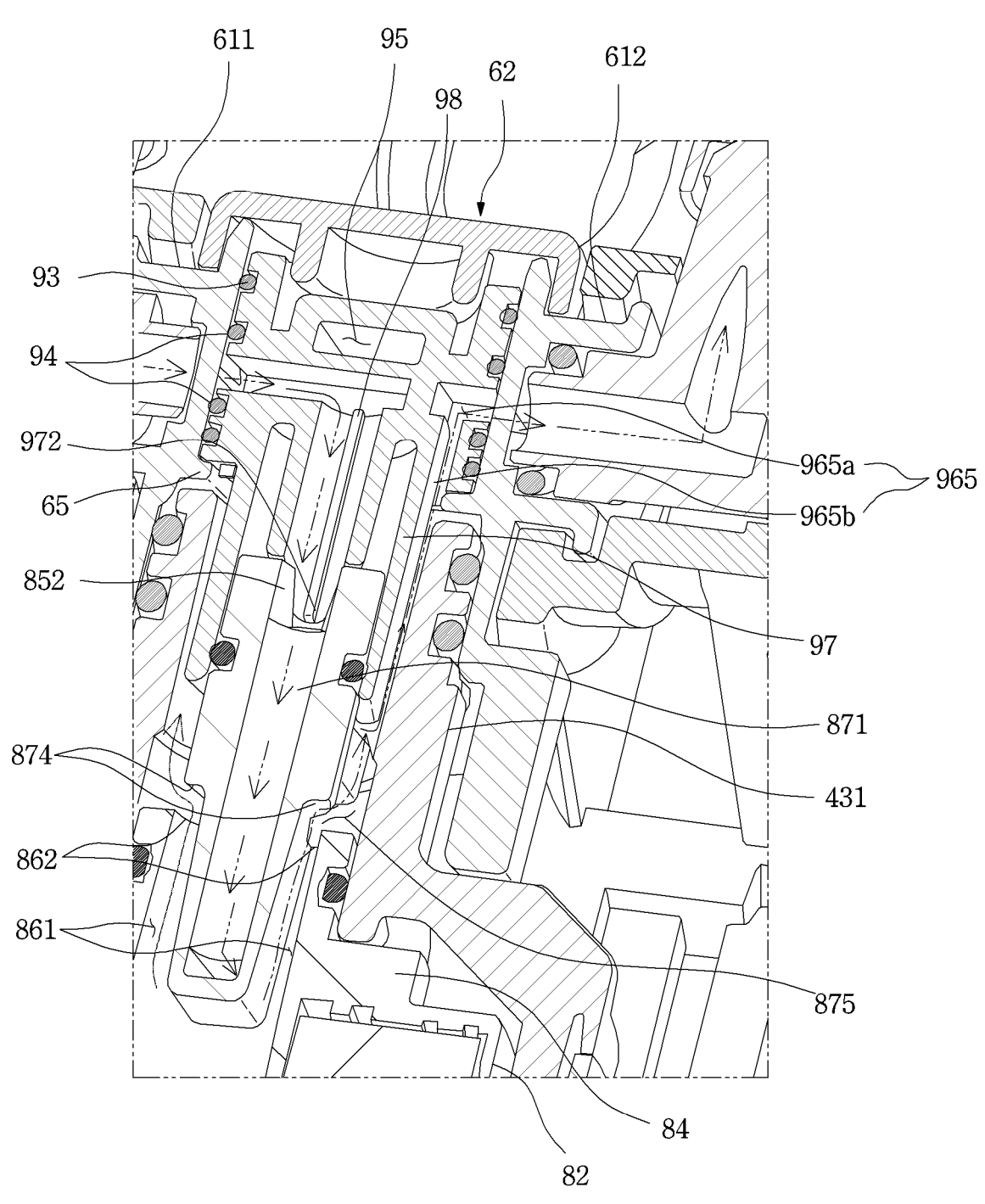
FIG. 23 is an enlarged view of portion B in FIG. 22.
Figure 24:
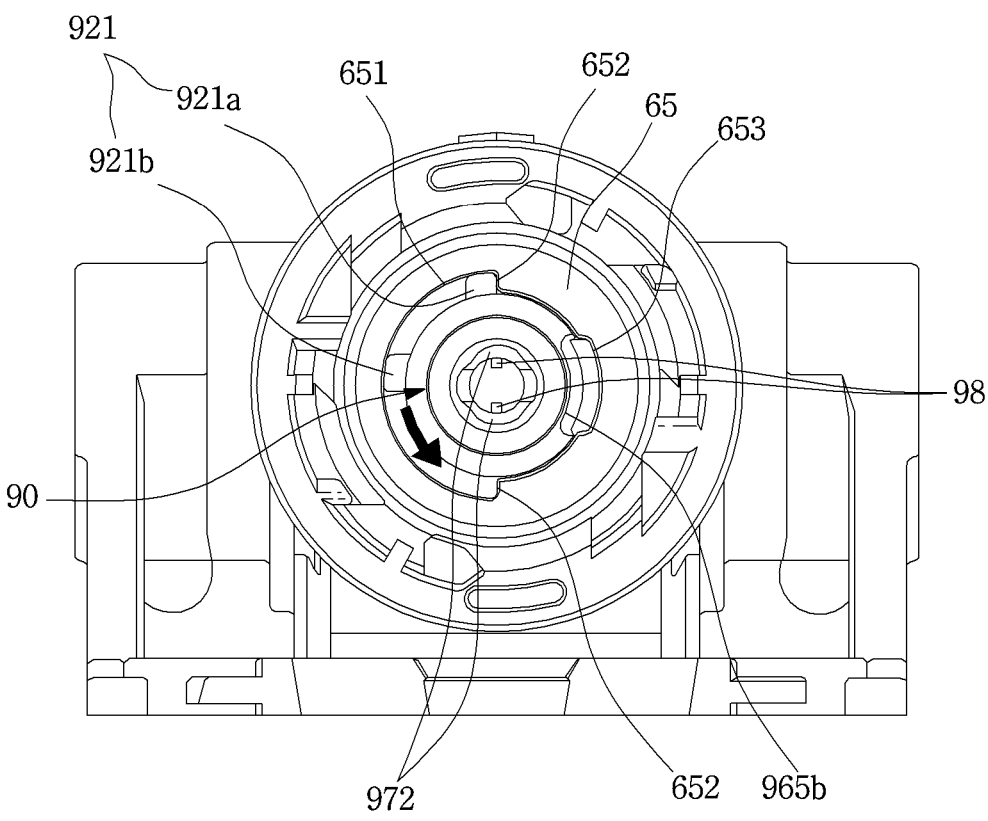
FIG. 24 is a view illustrating a shaft position in a state where the filter is coupled to the head.

FIG. 22 is a view illustrating a state where the filter is rotated for coupling in a state where the filter is fully inserted into the inside of the head. FIG. 23 is an enlarged view of portion B in FIG. 22. FIG. 24 is a view illustrating a shaft position in a state where the filter is coupled to the head.

When the filter 40 is further rotated by an angle of 90 degrees so that the coupling projection 433 and the coupling groove 631 are rotated to be fully coupled with each other, the shaft 90 is also rotated along with the rotation of the filter and thus is in a state of being illustrated in FIG. 24.

Specifically, when the filter 40 is rotated in a state where the second connecting portion 972 is inserted into the first connecting portion 851 and thus fully coupled with each other, the shaft 90 rotates along with the filter 40.

The shaft 90 may be further rotated by an angle of about 90 degrees until the second rotating projection 921b reaches the position of the stopper 652. When the shaft 90 is fully rotated, the filtering flow path 96 is connected to the water inlet portion 611 and the water outlet portion 612 with each other. Of course, the inner pipe 97 and the supporter extending portion 85 maintains a connected state with each other and thus the original water and the purified water is capable of flowing in and out between the head 60 and the filter 40. In addition, the coupling projection 433 is in a state of being fully inserted into and thus is coupled with the coupling groove 631 and the filter 40 is operated to be rotated in a direction which is opposite to the coupling direction by the user and thus the filter 40 is maintained in a state of coupling with the head 40 until the filter 40 is separated from the head 60.

In a state of being illustrated in FIG. 22, the water flowing in through the water inlet portion 611 flows along the shaft water inlet flow path 964 through the water inlet port 611a and the shaft inlet port 961. In other words, water flowing along the horizontal portion 964a and the vertical portion 964b passes by the inner pipe 97, flows into the inside of the supporter extending portion 85 and flows along the first filter inlet flow path 872 in the lower direction. Then, water is branched by the second filter inlet flow path 873 and flows into the space between the inner surface of the housing 41 and the filtering member 44.

The water flowing into the hollow 441 of the inside of the filtering member 44 from the outside of the filtering member 44 may be purified in the process of passing through the filtering member 44. The purified water of the inside of the filtering member 44 flows along the inside of the first extending portion 86 in the upper direction and is discharged from the filter outlet port 862 which is disposed on both sides of the upper end of the first extending portion 86 in the upper direction.

At this time, a space in which water purified by the outer surface of the first extending portion 86 and the lower part 92 inserted into the inside of the filter inserting portion 431 flows to the head 60 side is formed in the inside of the filter inserting portion 431. On the other hand, as illustrated in FIG. 24, in a state where the filtering flow path 96 is connected to the water inlet portion 611 and the water outlet portion 612, the water outlet guide portion 965b and the flow path cutout portion 653 are positioned at the same position with each other and thus the purified water is capable of flowing to the upper part 91 side.

Accordingly, the purified water flows along the water outlet guide portion 965b formed in the lower part 92 in the upper direction and flows into the inside of the upper part 91 and thus passes through the shaft outlet port 962 and the water outlet portion 612 in this order, and then is discharged to the water outlet portion 612. The water outlet pipe 302 of the water outlet portion 612 forms a portion of the water supplying flow path 30 to supply the purified water to the dispenser 23 and the ice maker 24.

In a state of being illustrated in FIG. 23, in a state where the filter 40 should be removed because of reach of period of replacement of the filter 40 or other maintenance, the filter 40 is first rotated in a direction which is opposite to the coupling direction.

The coupling projection 433 is moved in a direction away from the coupling groove 631 according to the rotation of the filter 40 and the supporter extending portion 85 rotates the shaft 90. When the filtering flow path 96 is closed by the shaft 90 being rotated by 90 degrees and then the bypass flow path 95 is connected, the rotating projection 921 is in contact with the stopper 652 and thus is restricted the rotation of the shaft 90.

In this state, when a force is applied to further rotate the filter 40, the shaft 90 is not capable of being further rotated by the stopper 652. Accordingly, a torsion moment is applied to the first inclined surface 853 and the second inclined surface 974 so that the second inclined surface 974 is smoothly separated along the first inclined surface 853 while being slid. Further, the coupling projection 433 which is escaped from the coupling groove 631 passes by the second groove guide portion 633b and the first groove guide portion 633a in this order to allow the filter 40 to be separated from the head 60.

On the other hand, in the embodiment of the present invention, as an example, the water purifying apparatus 17 is mounted on the refrigerator 1 in order to facilitate the understanding and the explanation. However, the water purifying apparatus 17 is capable of being applied to the water purifier which is generally used and the entire device which is capable of purifying water by a filter exchanging manner.

Figure 25:
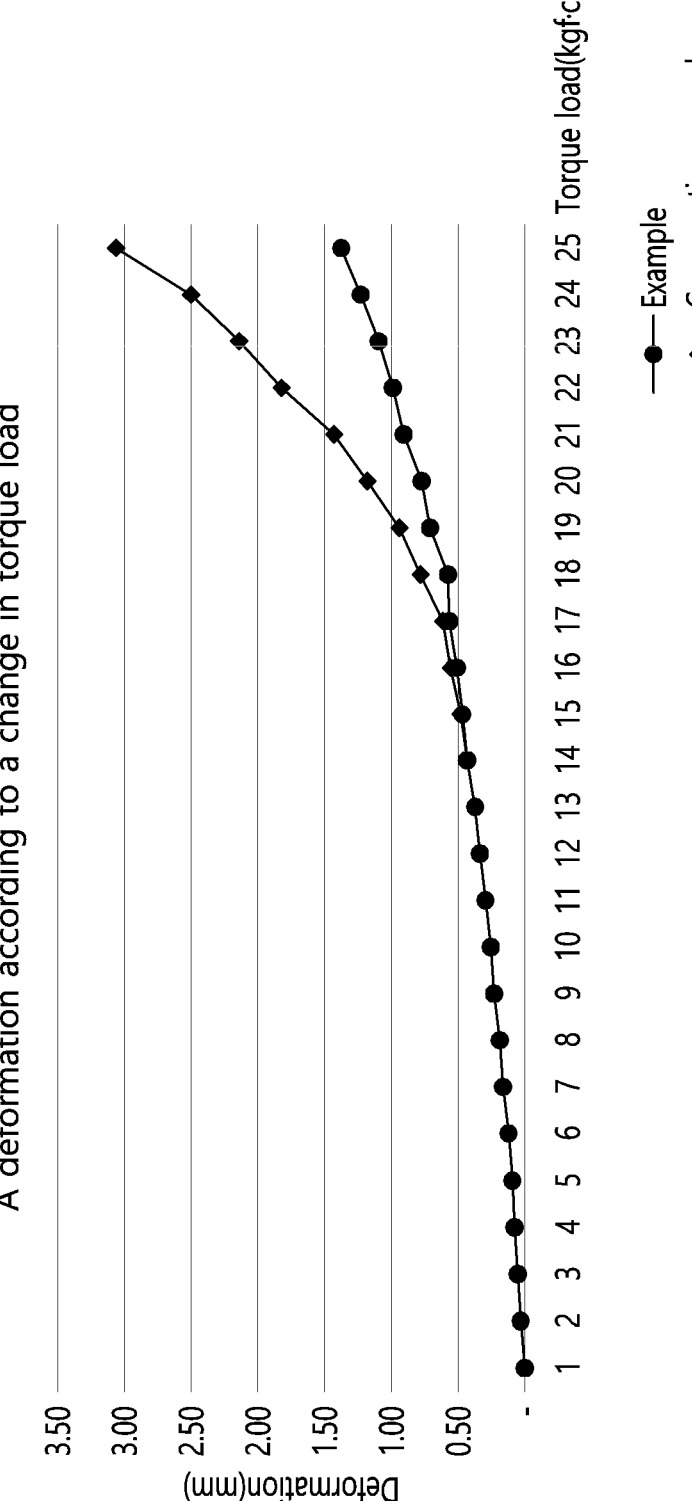
FIG. 25 is a graph showing a deformation according to a change in torque load.
Figure 26:
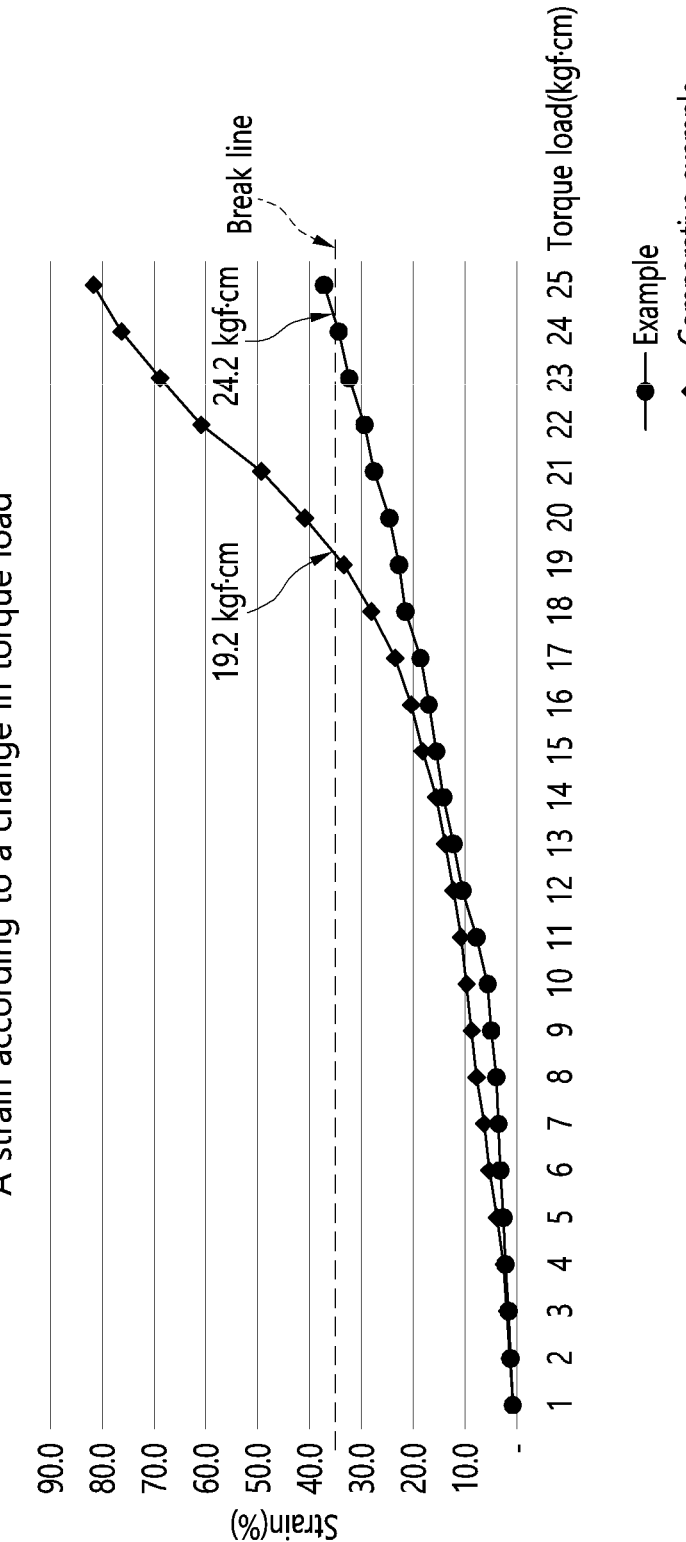
FIG. 26 is a graph showing a strain according to a change in torque load.

FIG. 25 is a graph showing a deformation according to a change in torque load. FIG. 26 is a graph showing a strain according to a change in torque load.

On the other hand, as shown in FIGS. 25 and 26, structural analysis was performed using a CAE (Computer Aided Engineering) program on the deformation and the strain of the inner pipe 97 according to a change in torque load.

As an example, the structural analysis was performed on the deformation and the strain using the CAE program while varying the torque load for the shaft 90 provided with the above-described reinforcing portion 98 on the inner surface of the inner pipe 97.

As a comparative example, the structural analysis was performed on the deformation and the strain using the CAE program while varying the torque load for the shaft 90 not provided with the reinforcing portion 98 on the inner surface of the inner pipe 97.

As shown in FIG. 25, when the torque load was in the range of 1 kgf·cm to 17 kgf·cm, the deformation of the example and the comparative example increased to about 0.5 mm together. After the torque load exceeded 17 kgf·cm, it was confirmed that the deformation of the comparative example in which the reinforcing portion 98 was not provided was deformed to a maximum of 3.00 mm.

On the other hand, in the case of the example in which the reinforcing portion 98 was provided on the inner side of the inner pipe 97, when the maximum torque load was 25 kgf·cm, the maximum deformation was 1.5 mm. It was confirmed that the maximum deformation was reduced to about half or less than that of the comparative example.

As shown in FIG. 26, even if the torque load was applied up to 24 kgf·cm, the shaft 90 in the example was deformed by about 35%. In the case of the comparative example, it was confirmed that about 80% of the strain occurred.

As such, the reinforcing portion 98 may be prevented from being damaged or deformed by twisting due to the rotational operation of the shaft 90.

Figure 27:
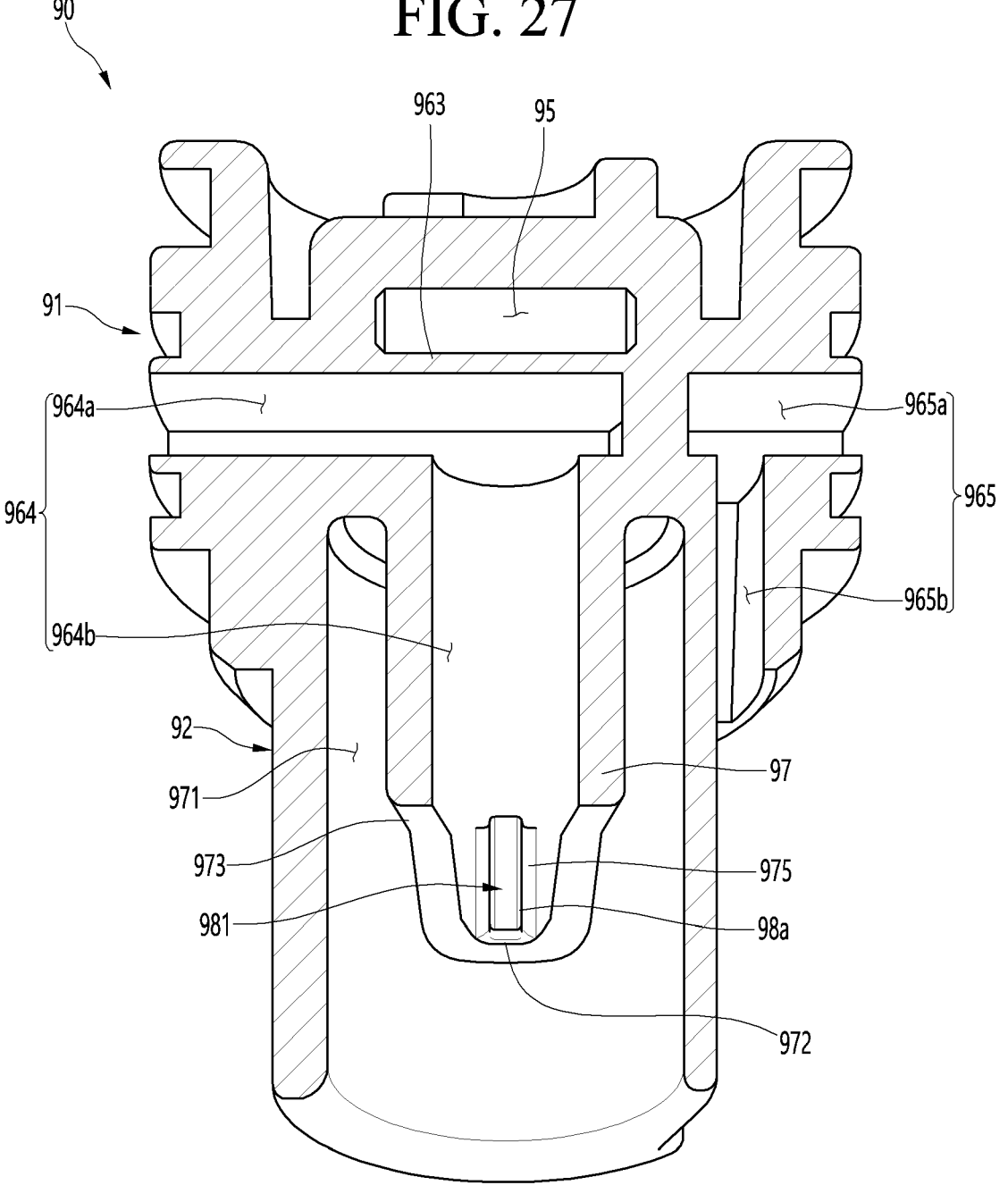
FIG. 27 is a cross-sectional view showing an internal structure of a shaft according to another embodiment of the present disclosure.

FIG. 27 is a cross-sectional view showing an internal structure of a shaft according to another embodiment of the present disclosure.

Hereinafter, the structure of the shaft 90 according to another embodiment of the present disclosure will be described in detail with reference to FIG. 27.

The shaft 90 according to another embodiment of the present disclosure may be he same as the structure of the shaft 90 described above, except that a reinforcing portion 981 projecting from the inner pipe 97 is formed at a lower end of an inner pipe 97.

In detail, the shaft 90 may include an upper part 91 and a lower part 92. A shaft inlet port 961 and a shaft outlet port 962 are formed on the outer surface of the upper part 91. A bypass inlet port 951 and a bypass outlet port 952 may be formed between the shaft inlet port 961 and the shaft outlet port 962.

The bypass flow path 95 and the filtering flow path 96 are formed inside the shaft 90. As the shaft 90 rotates, the water inlet portion 611 and the water outlet portion 612 may be selectively connected to the bypass flow path 95 and the filtering flow path 96.

An inner pipe 97 connected to a supporter extending portion 85 is formed inside the shaft 90. A reinforcing portion 981 projecting from the inner surface of the inner pipe 97 may be formed.

The reinforcing portion 981 may be formed at a position corresponding to the second connecting portion 972. The second connecting portion 972 may be assembled with the first connecting portion 851 of the supporter extending portion 85 so that water passing through the filtering flow path 96 is guided into the filter 40.

The reinforcing portion 981 may extend in a vertical direction along the inner surface of the second connecting portion 972. The upper end of the reinforcing portion 981 may extend to a position on the same line in the horizontal direction with respect to the upper end of the pipe cutout portion 973. The lower end of the reinforcing portion 981 may be positioned on the same line in the horizontal direction with respect to the lower end of the pipe cutout portion 973.

That is, the reinforcing portion 981 may be formed at the lower end portion of the inner pipe 97 at a position corresponding to the second connecting portion 972. With this structure, the strength of the second connecting portion 972 may be made more robust.

Inclined portions 975 may be formed on both sides of the reinforcing portion 981 to connect both side ends of the reinforcing portion 981 at the inner side of the inner pipe 97. As the inclined portion 975 extends in a direction adjacent to the reinforcing portion 981, the inclined portion 975 may be inclined in a direction closer to the center of the inner pipe 97.

A round portion 98*a* may be included at the corner of the reinforcing portion 981. The round portion 98*a* may prevent the inner pipe 97 from being damaged or deformed due to contact during the process of connecting or separating the end portion of the inner pipe 97 and the supporter extending portion 85. In addition, there is an advantage in that it is possible to prevent the end of the supporter extending portion 85 from being damaged by the end of the inner pipe 97.

A pair of reinforcing portions 981 may be formed at a position corresponding to the second connecting portion 972.

Figure 28:
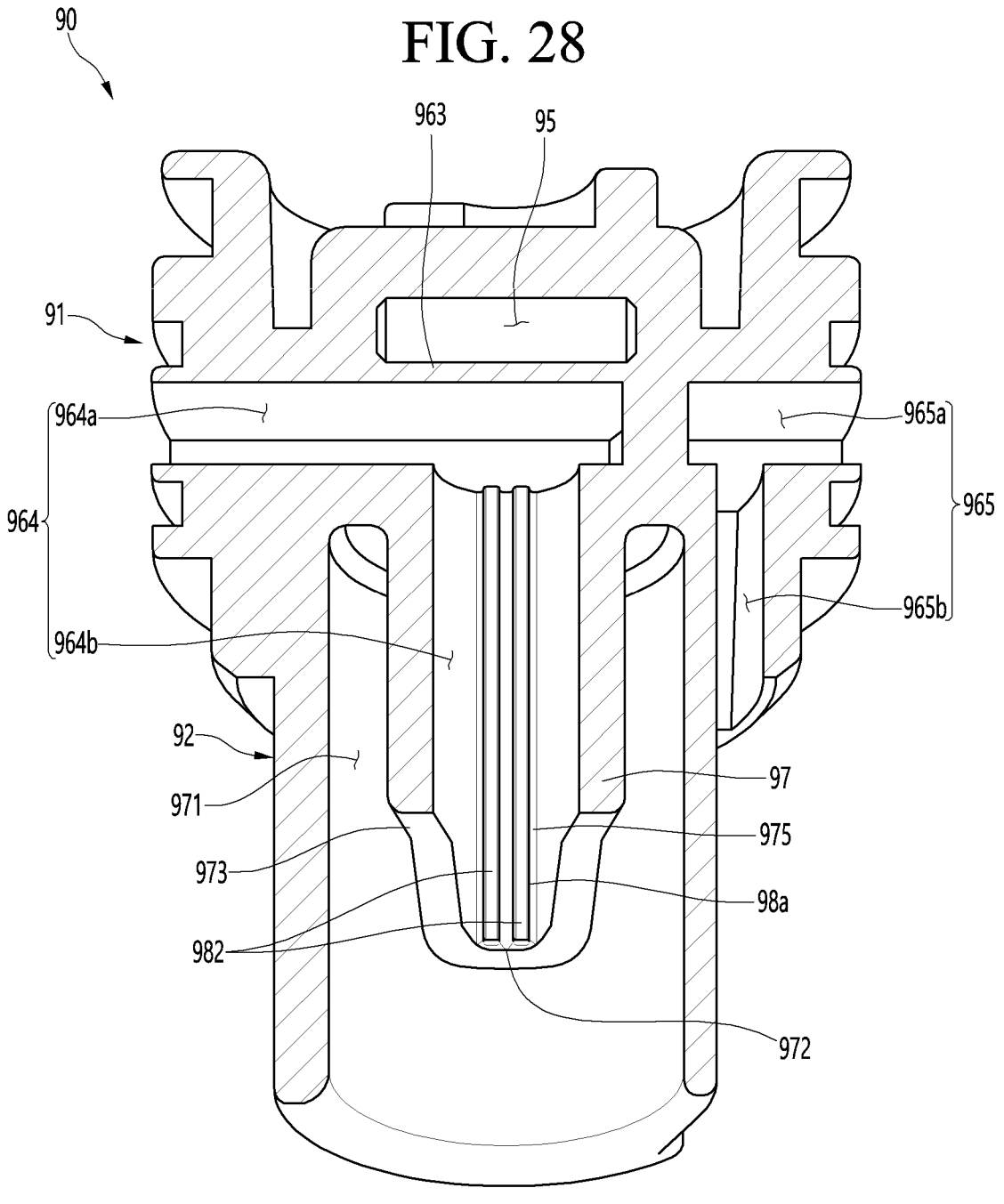
FIG. 28 is a cross-sectional view showing an internal structure of a shaft according to further another embodiment of the present disclosure.

FIG. 28 is a cross-sectional view showing an internal structure of a shaft according to further another embodiment of the present disclosure.

Hereinafter, the structure of the shaft 90 according to further another embodiment of the present disclosure will be described in detail with reference to FIG. 28.

The shaft 90 according to further another embodiment of the present disclosure may be he same as the structure of the shaft 90 described above, except that a plurality of reinforcing portions 982 projecting from the inner pipe 97 are formed at a pair of second connecting portions 972.

In detail, the shaft 90 may include an upper part 91 and a lower part 92. A shaft inlet port 961 and a shaft outlet port 962 are formed on the outer surface of the upper part 91. A bypass inlet port 951 and a bypass outlet port 952 may be formed between the shaft inlet port 961 and the shaft outlet port 962.

The filtering flow path 96 may include a shaft water inlet flow path 964 and a shaft water outlet flow path 965. The shaft water inlet flow path 964 includes a horizontal portion 964*a* which extends to the center of the shaft 90 and a vertical portion 964*b* which extends from an end portion of the vertical portion 964*a* in the lower direction.

The vertical portion 964*b* may be formed by the inner pipe 97. A reinforcing portion 982 projecting inward is formed on the inner surface of the inner pipe 97.

The reinforcing portion 982 may extend from the upper end to the lower end on the inner surface of the inner pipe 97. The reinforcing portion 982 may be provided at a position corresponding to a position where the second connecting portion 972 is formed.

A plurality of reinforcing portions 982 may be formed to be spaced apart from each other on the inner surface of the inner pipe 97 on which the second connecting portion 972 is formed.

Specifically, a pair of second connecting portions 972 are provided inside the inner pipe 97. A plurality of reinforcing portions 982 may be formed on an inner surface of the inner pipe 97 on which one of the pair of second connecting portions 972 is formed. A plurality of reinforcing portions 982 may be formed on the inner side of the inner pipe 97 on which the other second connection portion 972 is formed among the pair of second connecting portions.

With this structure, the strength of the inner pipe 97 may be more firmly maintained. The reinforcing portion 982 has an advantage of preventing water flowing into the vertical portion 964*b* from flowing back and moving to the horizontal portion 964*a*.

In the water purifying apparatus and the refrigerator including the same according to the proposed embodiments, the following effects can be expected.

According to the embodiments, in a case where the filter is separated from the head for replacement or maintenance of the filter, the bypass flow path connects to the water inlet portion and the water outlet portion so that the flow path is capable of being connected without generating leakage.

In addition, the filtering flow path is connected to the water inlet portion and the water outlet portion during the rotation operation for mounting the filter, so that purified water is capable of being supplied. Therefore, it is possible to switch the flow path without additional operation by the rotation operation of mounting and separating the filter, and thus the convenience of use is capable of being further improved.

In addition, in the embodiment of the present disclosure, the reinforcing part projecting inward is included on the inner surface of the inner pipe defining a portion of the filtering flow path. The reinforcement part has the advantage of preventing damage or deformation of the shaft by a force pressed from the outside during rotation operation for mounting or separating the filter. In particular, there is an effect of preventing the end portion of the inner pipe of the shaft from being damaged or deformed due to misassembly by a user who is inexperienced in replacing and mounting the filter.

In addition, according to the embodiment of the present disclosure, by providing the reinforcing part on the inner surface of the inner pipe, there is an advantage that water can flow smoothly from the horizontal portion defining the filtering flow path to the vertical portion defined by the inner pipe.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to describe the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:

1. A water purifying apparatus, comprising:
    a filter configured to purify incoming water and to discharge purified water;
    a head having a water inlet portion and a water outlet portion, wherein the filter is configured to removably couple to the head; and
    a shaft provided at the head and rotatably mounted between the water inlet portion and the water outlet portion, the shaft defining (i) a bypass flow path that directly connects the water inlet portion to the water outlet portion and (ii) a filtering flow path that provides a connection between the water inlet portion and the water outlet portion such that water received from the water inlet portion is discharged to the water outlet portion via the filter, the shaft comprising:
        an inner pipe that is configured to couple to a portion of the filter and that defines a portion of the filtering flow path,
        a body portion that surrounds the inner pipe, and
        a reinforcing portion protruding from an inner surface of the inner pipe,
    wherein a spacing space is defined between the body portion and the inner pipe and configured to receive at least a portion of the filter.

2. The water purifying apparatus of claim 1, wherein the reinforcing portion extends upward from a lower end of the inner pipe.

3. The water purifying apparatus of claim 1, wherein a first connecting portion is provided at one end of the filter and is configured to be coupled to the inner pipe, and
    wherein the first connecting portion is configured to surround the reinforcing portion.

4. The water purifying apparatus of claim 3, wherein a second connecting portion that is configured to be coupled to the first connection portion based on the filter being coupled to the head is provided at a lower end of the inner pipe, and
    wherein the reinforcing portion projects from an inner surface of the second connecting portion.

5. The water purifying apparatus of claim 4, wherein the reinforcing portion extends upward from a lower end of the second connecting portion.

6. The water purifying apparatus of claim 4, wherein a pair of second connecting portions are provided at the lower end of the inner pipe, and
    wherein a pair of reinforcing portions are provided at an inner surface of the pair of second connecting portions respectively.

7. The water purifying apparatus of claim 6, wherein a pair of pipe cutout portions are provided between the pair of second connecting portions, and
    wherein a pair of projecting portions project from an inner surface of the first connecting portion and are configured to be coupled to the pair of pipe cutout portions.

8. The water purifying apparatus of claim 7, wherein a lower end of the reinforcing portion is provided below an upper end of the pair of pipe cutout portions.

9. The water purifying apparatus of claim 7, wherein the reinforcing portion is provided between the pair of projecting portions.

10. The water purifying apparatus of claim 7, wherein first inclined surfaces are provided at both side ends of the pair of projecting portions, and
    wherein second inclined surfaces are provided at both side ends of the pair of second connecting portions and have an inclination corresponding to the first inclined surfaces.

11. The water purifying apparatus of claim 10, wherein the reinforcing portion is provided between first inclined surfaces provided at adjacent projecting portions.

12. The water purifying apparatus of claim 7, wherein a distance between the pair of projecting portions is greater than a distance between the pair of reinforcing portions.

13. The water purifying apparatus of claim 6, wherein a distance between the pair of reinforcing portions is greater than a distance from the inner surface of the pair of second connecting portions to a protruding end portion of the reinforcing portion.

14. The water purifying apparatus of claim 1, wherein the filter includes:
    a filtering member;
    a housing body that accommodates the filtering member;
    a housing cap coupled to an upper portion of the housing body; and
    one or more O-rings provided at an outer circumferential surface of an upper end of the housing cap,
    wherein the one or more O-rings surround the reinforcing portion.

15. The water purifying apparatus of claim 14, wherein the O-rings are configured to be in contact with an inner surface of the head.

16. The water purifying apparatus of claim 1, wherein the filtering flow path comprises:

a horizontal portion extending from a shaft entrance, wherein the horizontal portion is provided around the shaft toward a center of the shaft; and a vertical portion connected to an end portion of the horizontal portion and provided inside the inner pipe, and wherein a pair of reinforcing portions are provided to face each other in a direction intersecting an extension direction of the horizontal portion.

17. The water purifying apparatus of claim 1, wherein a pair of first connecting portions are provided at one end of the filter, wherein a pair of second connecting portions configured to be coupled to the pair of first connecting portions based on the filter being mounted are provided at a lower end of the inner pipe, wherein a pair of pipe cutout portions are provided between the pair of second connecting portions and configured to rotate the shaft by being coupled to the pair of first connecting portions based on the filter being rotated, and wherein the reinforcing portion is provided between the pair of pipe cutout portions.

18. The water purifying apparatus of claim 1, wherein the shaft is configured to rotate to thereby selectively couple the water inlet portion and the water outlet portion to either the bypass flow path or to the filtering flow path.

19. A refrigerator comprising:

a cabinet defining a storage space;

a door configured to open or close the storage space;

a water purifying apparatus provided in the storage space and configured to receive and purify water; and a dispenser provided at the door and configured to dispense water purified by the water purifying apparatus, wherein the water purifying apparatus comprises:

a filter configured to purify incoming water and discharge the purified water, a head having a water inlet portion and a water outlet portion, wherein the filter is configured to removably couple to the head, and a shaft provided at the head and rotatably mounted between the water inlet portion and the water outlet portion, the shaft defining (i) a bypass flow path that directly connects the water inlet portion and the water outlet portion and (ii) a filtering flow path that provides a connection between the water inlet portion and the water outlet portion such that water received from the water inlet portion is discharged to the water outlet portion via the filter, the shaft comprising:

an inner pipe that is configured to couple to a portion of the filter and that defines a portion of the filtering flow path, a body portion that surrounds the inner pipe, and a reinforcing portion projecting from an inner surface of the inner pipe, wherein a space is defined between the body portion and the inner pipe and configured to receive at least a portion of the filter.

20. The refrigerator of claim 19, wherein a first connecting portion is provided at one end of the filter and is configured to be coupled to the inner pipe, and wherein the first connecting portion is configured to surround the reinforcing portion.

* * * * *